US012570565B2

(12) United States Patent (10) Patent No.: US 12,570,565 B2
Fournel (45) Date of Patent: Mar. 10, 2026

(54) GLASS TUBE CONVERTING PROCESS WITH PIERCING DURING INDEX

(71) Applicant: CORNING INCORPORATED, Corning, NY (US)

(72) Inventor: Olivier Fournel, Yerres (FR)

(73) Assignee: CORNING INCORPORATED, Corning, NY (US)

( * ) Notice: Subject to any disclaimer, the term of this patent is extended or adjusted under 35 U.S.C. 154(b) by 237 days.

(21) Appl. No.: 18/206,857

(22) Filed: Jun. 7, 2023

(65) Prior Publication Data

US 2023/0391658 A1 Dec. 7, 2023

Related U.S. Application Data

(60) Provisional application No. 63/349,732, filed on Jun. 7, 2022.

(51) Int. Cl.
 *C03B 23/045* (2006.01)
(52) U.S. Cl.
 CPC ................................. *C03B 23/045* (2013.01)
(58) Field of Classification Search
 None
 See application file for complete search history.

(56) References Cited

U.S. PATENT DOCUMENTS

| | | | |
|---|---|---|---|
| 10,968,133 | B2 | 4/2021 | Gaylo et al. |
| 11,186,513 | B2 | 11/2021 | Gaylo et al. |
| 11,339,079 | B2 | 5/2022 | Klingensmith et al. |
| 11,420,893 | B2 | 8/2022 | McEnroe |
| 2019/0161381 | A1 | 5/2019 | Klingensmith et al. |
| 2019/0161384 | A1 | 5/2019 | Mcenroe |

FOREIGN PATENT DOCUMENTS

WO WO-2019108707 A1 * 6/2019 ............. C03B 35/26

* cited by examiner

*Primary Examiner* — Queenie S Dehghan
(74) *Attorney, Agent, or Firm* — Chandra J. Duncan

(57) ABSTRACT
Converters for producing glass articles from glass tubes include a thermal separating station to separate the glass articles from the working end of the glass tube. Thermal separation forms a meniscus of glass at the working end of the glass tube. Instead of a stationary piercing station to pierce the meniscus, the converter includes an auxiliary processing station disposed directly downline from the separating station, where the auxiliary processing station is a heating station or a forming station. The converter includes a piercing device disposed between the separating station and the auxiliary processing station. The piercing device pierces the meniscus at the working end of the glass tube during the index time as the converter translates the glass tube between the separation station and the auxiliary processing station. Methods of producing glass articles include piercing the meniscus during the index time.

8 Claims, 15 Drawing Sheets

GLASS TUBE CONVERTING PROCESS WITH PIERCING DURING INDEX

CROSS-REFERENCE TO RELATED APPLICATIONS

This application claims the benefit of priority under 35 U.S.C. § 119 of U.S. Provisional Application Ser. No. 63/349,732 filed on Jun. 7, 2022, the content of which is relied upon and incorporated herein by reference in its entirety.

FIELD

The present specification generally relates to systems and processes for producing glass articles from glass tubes, in particular, glass tube converting systems and processes including piercing during the index time of the converter.

TECHNICAL BACKGROUND

Historically, glass has been used as the preferred material for packaging pharmaceuticals because of its hermeticity, optical clarity, and excellent chemical durability relative to other materials. Specifically, the glass used in pharmaceutical packaging must have adequate chemical durability to prevent affecting the stability of the pharmaceutical formulations contained therein. Glasses having suitable chemical durability include those glass compositions within the ASTM standard 'Type IA' and 'Type IB' glass compositions, which have a proven history of chemical durability.

Glass tubing may be converted into other glass articles, such as various glass containers for use in pharmaceutical applications including, without limitation, vials, syringes, ampoules, cartridges and other glass articles. The glass tubing may be converted, for example, in "converting machines." These converting machines typically reform long lengths of glass tube into a plurality of glass articles using steps that include flame working, rotating and stationary tool forming, thermal separation, or score and shock cutoff steps. Various burners and forming tools are often used to shape one or more articles from the glass tube and separate the article from the glass tube.

SUMMARY

During conversion of glass tube to glass articles using a converting machine (i.e., converter), heating elements, such as burners, heat the glass of the glass tube in one or more heating stations to a temperature at which the viscosity of the glass allows the glass to be formed into one or more features of the glass article. Forming stations include forming tools, such as pin and wheel assemblies, to make contact with the heated glass tube and form the internal and external dimensions of features of the finished glass articles. Following formation of the features at the working end of the glass tube, a glass article comprising the formed features is separated from the working end of the glass tube in a separating station and passed to a bottom-forming machine. When the converter includes thermal separation of the glass article from the working end of the glass tube, thermal separation of the glass article forms a meniscus of glass over the new working end of the glass tube.

Typical converting machines include a piercing station disposed downline from the separating station, the piercing station being configured to pierce the meniscus of the glass tube before further heating and forming of the working end.

However, piercing the meniscus takes only small portion of the dwell time of the converter. During the rest of the dwell time in the converter, the glass tube is idle. Accordingly, a need exists for converter systems and processes that provide improve utilization of the dwell time of the glass tube converter.

In a first aspect disclosed herein, a converter for producing a plurality of glass articles from glass tube can comprise a plurality of holders. Each of the plurality of holders can be operable to secure a glass tube and rotate the glass tube about a center axis of the glass tube. The converter can further include a plurality of processing stations that can comprise a plurality of heating stations, at least one forming station, and a separating station. The converter may be operable to index the plurality of holders and glass tubes through each of the plurality of processing stations. The separating station may be operable to separate a glass article from a working end of the glass tube. Separating the glass article from the working end of the glass tube may form a meniscus of glass at the working end of the glass tube. The converter can further comprise an auxiliary processing station disposed directly downline from the separating station, where the auxiliary processing station can comprises one of the plurality of heating stations or one of the at least one forming stations. The converter can further include a piercing device disposed between the separating station and the auxiliary processing station. The piercing device can be positioned to pierce the meniscus at the working end of the glass tube while the converter indexes the glass tube between the separating station and the auxiliary processing station during an index time of the converter, where the index time of the converter is a duration of time during which the glass tube is translated from one processing station to a next immediately adjacent processing station.

A second aspect of the present disclosure may include the first aspect, wherein the piercing device may be coupled to a fixed position along a path of travel of the glass tube from the separating station to the auxiliary processing station.

A third aspect of the present disclosure may include either one of the first or second aspects, further comprising an actuator coupled to the piercing device.

A fourth aspect of the present disclosure may include the third aspect, wherein the actuator may be operable to translate the piercing device into and out of a position at which the piercing device engages the meniscus at the working end of the glass tube when the glass tube is translated past the position.

A fifth aspect of the present disclosure may include either one of the third or fourth aspects, wherein the actuator may be operable to translate the piercing device along at least a portion of a path of travel of the glass tube from the separating station to the auxiliary processing station.

A sixth aspect of the present disclosure may include any one of the first through fifth aspects, wherein the piercing device may comprise at least one piercing burner positioned to direct a flame towards the meniscus at the working end of the glass tube when the glass tube is translated past the at least one piercing burner.

A seventh aspect of the present disclosure may include the sixth aspect, wherein the at least one piercing burner may comprise a single point burner.

An eighth aspect of the present disclosure may include either one of the sixth or seventh aspects, wherein the at least one piercing burner may comprise a plurality of piercing burners arranged in succession along a path of travel of the glass tube from the separating station to the auxiliary processing station.

A ninth aspect of the present disclosure may include any one of the sixth through eighth aspects, wherein the at least one piercing burner may be a shaped burner configured to produce a shaped flame that extends along a portion of a path of travel of the glass tube from the separating station to the auxiliary processing station.

A tenth aspect of the present disclosure may include any one of the sixth through ninth aspects, wherein the at least one piercing burner may be disposed below the working end of the glass tube so that the flame of the piercing burner extends upward to contact the meniscus of the glass tube when the glass tube passes over the piercing burner.

An eleventh aspect of the present disclosure may include any one of the first through tenth aspects, wherein each of the plurality of processing stations may be stationary and the converter may index the glass tube through each of the plurality of processing stations in succession.

A twelfth aspect of the present disclosure may include any one of the first through eleventh aspects, wherein the piercing device may be positioned so that the piercing device does not pierce the meniscus of the glass tube during the dwell time of the converter, where the dwell time is a duration of time that the glass tube spends in a particular processing station before being translated to the next immediately adjacent processing station.

A thirteenth aspect of the present disclosure may include any one of the first through twelfth aspects, wherein no processing stations that are configured to process the working end of the glass tube during the dwell time are disposed between the separating station and the auxiliary processing station.

A fourteenth aspect of the present disclosure may include any one of the first through thirteenth aspects, wherein the auxiliary processing station may be one of the plurality of heating stations.

A fifteenth aspect of the present disclosure may include any one of the first through thirteenth aspects, wherein the auxiliary processing station may be one of the at least one forming stations.

A sixteenth aspect of the present disclosure may include any one of the first through fifteenth aspects, wherein the auxiliary processing station is not a piercing station.

A seventeenth aspect of the present disclosure may include any one of the first through sixteenth aspects and may be directed to a method for producing a plurality of glass articles from glass tubes using the converter of any one of the first through sixteenth aspects. The method may include securing a glass tube in a holder of the converter, forming one or more features of a glass article at a working end of the glass tube by indexing the glass tube through each of the plurality of heating stations and the at least one forming station, separating the glass article from the working end of the glass tube in the separating station, indexing the glass tube from the separating station to an auxiliary processing station disposed directly downline of the separating station, and piercing the meniscus while indexing the glass tube between the separating station and the auxiliary processing station during an index time of the converter.

According to an eighteenth aspect of the present disclosure, a method for producing a plurality of glass articles from glass tube may include securing a glass tube in a holder of a converter comprising a plurality of processing stations. The plurality of processing stations may comprises a plurality of heating stations, at least one forming station, and a separating station, and the converter may index the holder and the glass tube successively through each of the processing stations. The method may further include forming one or more features of a glass article at a working end of the glass tube by indexing the glass tube through each of the plurality of heating stations and the at least one forming station. The method may include separating the glass article from the working end of the glass tube in the separating station. Separating the glass article from the working end of the glass tube may form a meniscus of glass at the working end of the glass tube. The method may further include indexing the glass tube from the separating station to an auxiliary processing station that may be disposed directly downline of the separating station. The auxiliary processing station may be one of the plurality of heating stations or one of the forming stations. The method may further include piercing the meniscus while indexing the glass tube between the separating station and the auxiliary processing station during an index time of the converter. The index time is a duration of time during which the glass tube is translated from one processing station to a next immediately adjacent processing station. Piercing the meniscus may open the working end of the glass tube.

A nineteenth aspect of the present disclosure may include either one of the seventeenth or eighteenth aspects, wherein piercing the meniscus of the glass tube may comprise passing the glass tube into engagement with a piercing device disposed between the separating station and the auxiliary processing station.

A twentieth aspect of the present disclosure may include any one of the seventeenth through nineteenth aspects, wherein piercing the meniscus does not occur during a dwell time of the converter, wherein the dwell time is a duration of time that the glass tube spends in a particular processing station before being translated to the next immediately adjacent processing station.

A twenty-first aspect of the present disclosure may include any one of the seventeenth through twentieth aspects, wherein piercing the meniscus of the glass tube may comprise translating the glass tube over a piercing device positioned below a path of travel of the glass tube between the separating station and the auxiliary processing station.

A twenty-second aspect of the present disclosure may include the twenty-first aspect, comprising maintaining the piercing device at a fixed position and translating the glass tube past the piercing device at the fixed position.

A twenty-third aspect of the present disclosure may include the twenty-first aspect, comprising translating the piercing device into and out of a position at which the piercing device engages the meniscus at the working end when the glass tube is passed by the position.

A twenty-fourth aspect of the present disclosure may include the twenty-first aspect, comprising translating the piercing device with the glass tube along at least a portion of the path of travel of the glass tube between the separating station and the auxiliary processing station. Translating the piercing device with the glass tube may maintain the piercing device in engagement with the meniscus of the glass tube for a greater period of time compared to maintaining the piercing device at a fixed position.

A twenty-fifth aspect of the present disclosure may include any one of the eighteenth through twenty-fourth aspects, wherein the piercing device may be a piercing burner.

A twenty-sixth aspect of the present disclosure may include any one of the seventeenth through twenty-fifth aspects, wherein piercing the meniscus of the glass tube may comprise heating the meniscus with a piercing burner while translating the glass tube between the separating station and the auxiliary processing station.

A twenty-seventh aspect of the present disclosure may include the twenty-sixth aspect, wherein the piercing burner may be a single point burner.

A twenty-eighth aspect of the present disclosure may include either one of the twenty-sixth or twenty-seventh aspects, comprising passing the glass tube into engagement with a plurality of piercing burners arranged successively along a path of travel of the glass tube from the separating station to the auxiliary processing station.

A twenty-ninth aspect of the present disclosure may include any one of the twenty-sixth through twenty-eighth aspects, wherein the piercing burner may be a shaped burner configured to produce a shaped flame that extends along at least a portion of a path of travel of the glass tube from the separating station to the auxiliary processing station.

A thirtieth aspect of the present disclosure may include any one of the eighteenth through twenty-ninth aspects, wherein the auxiliary processing station is not a piercing station.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
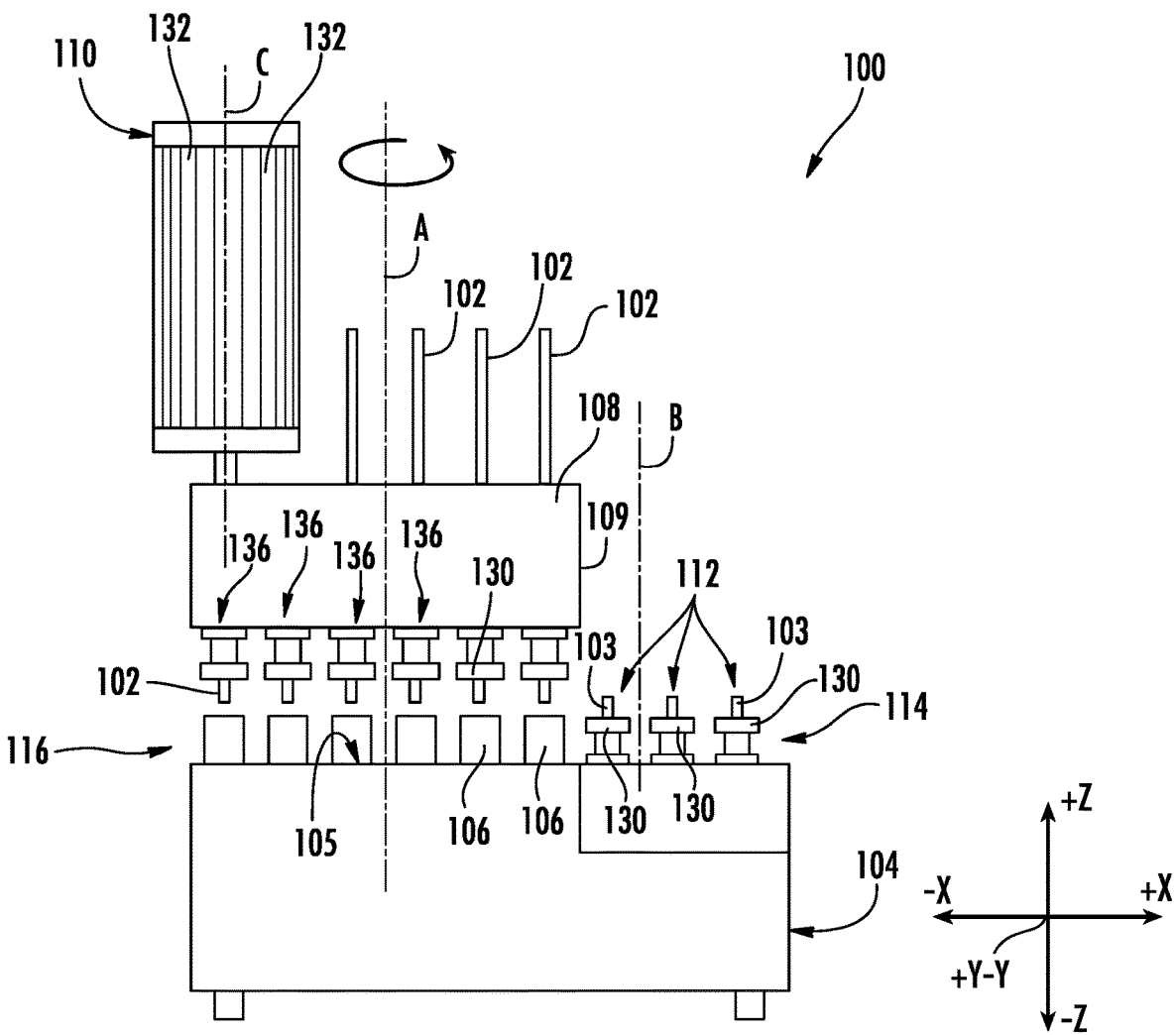
FIG. 1 schematically depicts a front view of an embodiment of a converter for producing glass articles from glass tubes, according to one or more embodiments shown and described herein.

Reference will now be made in detail to embodiments of systems and methods of the present disclosure for converting glass tubes to glass articles, examples of which are illustrated in the accompanying drawings. Whenever possible, the same reference numerals will be used throughout the drawings to refer to the same or like parts.

Figure 2:
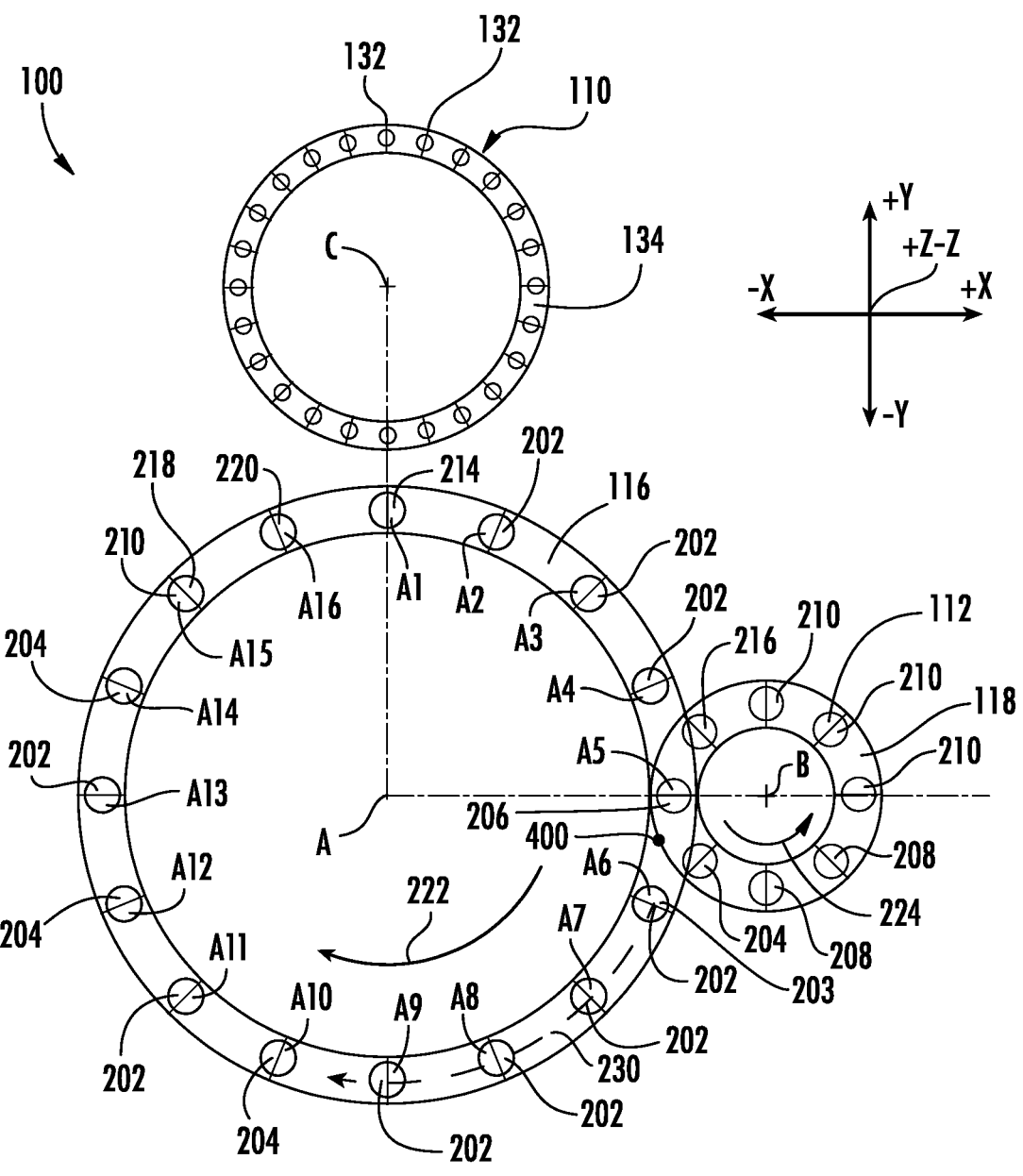
FIG. 2 schematically depicts a top view of a main turret and a secondary turret of the converter of FIG. 1 having an auxiliary processing station directly downline from a separating station, according to one or more embodiments shown and described herein.

Referring to FIGS. 1 and 2, one embodiment of a converter 100 for producing a plurality of glass articles from glass tube 102 is schematically depicted. The converter 100 includes a plurality of holders 130, where each of the plurality of holders 130 is operable to secure a glass tube 102 and rotate the glass tube 102 about a center axis of the glass tube 102. The converter 100 further includes a plurality of processing stations 106 comprising a plurality of heating stations 202, at least one forming station 204, and a separating station 206, where the converter 100 is operable to index the plurality of holders 130 and glass tubes 102 through each of the plurality of processing stations 106. The separating station 206 can be operable to separate a glass article 103 from a working end of the glass tube 102, where separating the glass article 103 from the working end of the glass tube 102 forms a meniscus of glass at the working end of the glass tube 102. The converter 100 can further include an auxiliary processing station 203 disposed directly downline from the separating station 206. The auxiliary processing station 203 can comprise one of the plurality of heating stations 202 or one of the forming stations 204. The converter 100 can further include a piercing device 400 disposed between the separating station 206 and the auxiliary processing station 203. The piercing device 400 is positioned to pierce the meniscus at the working end of the glass tube 102 while the converter 100 indexes the glass tube 102 between the separating station 206 and the auxiliary processing station 203 during the index time of the converter 100.

The converter 100 disclosed herein can be used in methods for producing a plurality of the glass articles 103 from the glass tube 102. The methods can include securing a glass tube 102 in a holder 130 of the converter 100 comprising the plurality of processing stations 106, which include the plurality of heating stations 202, the at least one forming station 204, and a separating station 206. The converter 100 indexes the holder 130 and the glass tube 102 successively through each of the processing stations 106. The methods can further include forming one or more features of a glass article 103 at a working end of the glass tube 102 by indexing the glass tube 102 through each of the plurality of heating stations 202 and the at least one forming station 204 and separating the glass article 103 from the working end of the glass tube 102 in the separating station 206, where separating the glass article 103 from the working end of the glass tube 102 forms a meniscus of glass at the working end of the glass tube 102. The methods can further include indexing the glass tube 102 from the separating station 206 to the auxiliary processing station 203 disposed directly downline of the separating station 206, where the auxiliary processing station 203 comprises one of the heating stations 202 or one of the forming stations 204. The methods can further include piercing the meniscus while indexing the glass tube 102 between the separating station 206 and the auxiliary processing station 203 during the index time of the converter 100. Piercing the meniscus opens the working end of the glass tube 102.

Piercing the meniscus during the index time of the converter 100 enables the processing station 106 that is immediately adjacent to and directly downline from the separating station 206 to be reallocated to an auxiliary processing station 203 instead of a piercing station. The auxiliary processing station 203 can be a heating station 202 or a forming station 204. The addition of the auxiliary processing station 203 can improve utilization of the dwell time of the converter 100 by using the unused dwell time from a piercing station for a rate limiting step such as heating or forming. The addition of the auxiliary processing station 203 can also expand the capability of the converter 100 to produce a greater variety of shapes and sizes of glass articles 103.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "working end" of the glass tube is the end of the glass tube oriented towards the processing stations of the main turret of the converter relative to the holder, and the "non-working end" of the glass tube is the end of the glass tube oriented away from the processing stations of the main turret.

As used herein, a "dwell time" of the converter refers to the duration of time that the glass tube spends in a particular processing station before passing to the next subsequent processing station. For an indexing converter, the dwell time is the time that elapses from a first time when the glass tube comes to a stationary position in the processing station and a second time when the glass tube starts to move out of the stationary position towards the next processing station.

As used herein, the term "active time" refers to a duration of time that the glass tube is maintained in engagement with at least one heating element or at least one forming tool while in a particular processing station.

As used herein, the term "index time," when used in relation to an index converter, refers to a duration of time during which the glass tube is translated from one processing station to the next processing station immediately downline from the one processing station. The "dwell time," "active time," and "index time" are all measured in units of time.

When used in relation to a heating station, "engagement" of a burner 302 with the glass tube 102 may refer to placing the burner 302 in a position in which the flame from the burner 302 extends towards the glass tube 102 or contacts the glass tube 102 to heat the glass tube 102. Conversely, when a burner 302 is out of engagement with the glass tube 102, the burner 302 is placed in a position in which the flame from the burner 302 is directed away from the glass tube 102 or moved far enough away from the glass tube 102 so that the flame does not contact or directly heat the glass tube 102.

When used in relation to forming tools 324 in a forming station 204, the term "engagement" refers to the forming tools 324 contacting the glass tube 102. When a forming tool 324 is out of engagement, the forming tool 324 does not contact the glass tube 102.

As used herein, the term "part rate" refers to the production rate or throughput rate of the converter in units of number of glass articles per unit time.

As used herein, the term "circumference" of the glass tube refers to a collection of points of the glass tube 102 at constant radius r from the center axis D of the glass tube 102 at a particular Z position (i.e., position on the +/−Z axis of the figures) through 360 degrees. A circumference of the glass tube 102 may coincide with an outer surface 140 of the glass tube 102 at a particular Z position or an inner surface 146 of the glass tube 102 at a different Z position, for example.

As used herein, the term "run" refers to the normal steady state operation of the converter. Thus, as used herein, a "run setting" refers to a setting of the converter for normal steady state operation of the converter.

As used herein, the terms "upline" and "downline" refer to the positioning of processing stations of the converter relative to each other. A first processing station is considered "downline" of a second processing station if the glass tube encounters the second processing station before encountering the first processing station. Likewise, the first processing station is considered "upline" of the second processing station if the glass tube encounters the first processing station before encountering the second processing station.

Glass tubing can be converted into glass articles, in particular glass articles for use in pharmaceutical applications, which can include, without limitation, vials, syringes, ampoules, cartridges, jars, and other glass articles. The glass tubing can be converted into these glass articles using a converter, such as a converting machine, comprising a plurality of processing stations. The processing stations can include but are not limiting to heating stations, forming stations, separating stations, piercing stations, cooling stations, polishing stations, measuring stations, or other types of processing stations. The converting machines typically reform long glass tube lengths into a plurality of glass articles using steps that include, but are not limited to, flame working, rotating and stationary tool forming, separation (e.g., thermal separation or score and shock cut-off steps), piercing, cooling, measuring, or other processing steps. Thus, glass articles produced through a converting process conducted on a converting machine are subjected to a series of flame burners or other heating elements and forming tools to shape the glass tube to specific shapes and dimensions and separate a formed glass article from the working end of the glass tube.

Referring now to FIG. 1, one embodiment of the converter 100 for producing glass articles from a glass tube 102 is schematically depicted. The converter 100 converts glass tubes 102 into a plurality of glass articles. The converter 100 can include a base 104 having a plurality of processing stations 106 and a main turret 108 positioned above the base 104 and rotatable relative to the base 104 about the central axis A. The converter 100 can further include a glass tube loading turret 110 positioned above the main turret 108 for feeding glass tubes 102 to the main turret 108. The converter 100 can also include a plurality of secondary processing stations 112 on the base 104 and a secondary turret 114, which may be rotatable relative to the base 104.

As schematically depicted in FIG. 1, the base 104 of the converter 100 can be stationary and the processing stations 106 can be coupled to an upper portion 105 of the base 104. The plurality of processing stations 106 can be spaced apart from one another and arranged in a main circuit 116. In embodiments, the main circuit 116 can be circular so that the main turret 108 indexes the glass tube 102 through the plurality of processing stations 106 by rotation of the main turret 108 about the central axis A. Alternatively, in embodiments, the main circuit 116 can be linear arrangement of the processing stations 106. Although described herein in reference to a circular-shaped arrangement of the processing stations 106, it is understood that the subject matter disclosed herein may apply equally well to converters having other arrangements of the processing stations 106, such as linear, curvilinear, or irregular-shaped arrangements of processing stations 106.

The type and/or shape of the glass articles to be made from the glass tube 102 can influence the total number of processing stations 106 of the converter 100. The number of processing stations 106 of the main turret 108 can be from 14 to 32 processing stations 106. Although the converter 100 and converting process are described herein in the context of a converter 100 having sixteen processing stations 106 in the main circuit 116, it is understood that the converter 100 can have more or less than sixteen processing stations 106 in the main circuit 116. The processing stations 106 of the converter 100 can include, by way of example and without limitation, one or more heating stations, forming stations, polishing stations, cooling stations, separating stations, measuring stations, tube loading stations, discharge stations, other processing stations, or combinations of these for producing the glass articles from the glass tubes 102. The type and/or shape of the article to be made from the glass tube 102 can also influence the type of processing stations 106 and/or the order of processing stations 106 of the converter 100 in the main circuit 116.

The main turret 108 is generally positioned above the base 104 and is rotatable about the central axis A relative to the base 104. A drive motor (not shown) can be utilized to rotate the main turret 108 relative to the base 104. The main turret 108 includes a plurality of holders 130, which are configured to removably secure each glass tube 102 to the main turret 108 and rotate the glass tube 102. The holders 130 can include, but are not limited to, clamps, chucks, or other holding devices, or combinations of holding devices. The holders 130 can orient each glass tube 102 so that the glass tube 102 is generally parallel to the central axis A of the main turret 108. Although the converter 100 is described in this specification in the context of a vertically oriented converter 100, it should be understood that the converter 100 could be oriented horizontally or at an angle such that the glass tube 102 is non-vertical during processing. Each of the holders 130 can extend from a bottom portion 109 of the main turret 108 in a direction towards the base 104 (i.e., in the −Z direction relative to the coordinate axis in FIG. 1). Each holder 130 can be oriented to position the working end 150 of the glass tube 102 in or proximate to each of the successive processing stations 106 of the main circuit 116 as the holder 130 is indexed to each of the successive processing stations 106. Vertical orientation of the glass tubes 102 allows a downward protruding portion of each glass tube 102 to be indexed progressively through the processing stations 106.

The converter 100 of the present disclosure can be an indexing converter 100 where the converter 100 indexes each of the plurality of holders 130 progressively through the plurality of processing stations 106. Indexing refers to the stepwise process of moving the glass tube 102 into a processing station 106, maintaining the glass tube 102 at a stationary XYZ position in the processing station 106 for a dwell time, and then indexing the glass tube 102 to the next processing station 106. During the dwell time, the glass tube 102 is processed in the processing station 106, such as but not limited to being heated, formed, cooled, measured, separated, etc. During the index time, the holder 130 and glass tube 102 are translated between two immediately adjacent processing stations 106.

Each holder 130 can be individually rotatable relative to the main turret 108 to rotate the glass tube 102 about center axis D of the glass tube 102, which may be generally parallel to the central axis A of the main turret 108. Each of the holders 130 can be operatively coupled to a motor (not shown), continuous drive belt, or other drive mechanism for rotation of each of the holders 130 relative to the main turret 108. Rotation of the holders 130 allows for rotation of the glass tube 102 about center axis D of the glass tube 102 relative to stationary heating elements, forming tools, cooling nozzles, or other features of the processing stations 106. In embodiments, the heating elements and/or forming tools in the processing stations 106 can be maintained in a fixed position relative to the glass tube 102, and the rotation of the glass tube 102 about center axis D can enable exposure of the entire circumference of the glass tube 102 to the heating elements or forming tools.

Referring to FIGS. 1 and 2, as previously discussed, the converter 100 can include a plurality of secondary processing stations 112, which are spaced apart and arranged in a secondary circuit 118 (FIG. 2). The converter 100 can include a secondary turret 114 (FIG. 1) for indexing or continuously moving an article 103 (FIG. 1), which has been separated from the glass tube 102, through the plurality of secondary processing stations 112. The secondary turret 114 can be rotated about a second axis B relative to the base 104, where second axis B is generally parallel to central axis A of the main turret 108. The secondary turret 114 can also include a plurality of holders 130 to hold the glass articles 103 and position the glass articles 103 to engage with each of the secondary processing stations 112 in succession. The secondary turret 114 receives the glass articles 103 from a separating station 206 (FIG. 2) of the main turret 108, indexes or continuously translates the glass articles 103 through the plurality of secondary processing stations 112 through rotation of the secondary turret 114, and discharges the finished glass articles 103 from the converter 100. Although shown in a circular pattern, it is understood that the secondary processing stations 112 can be arranged in a linear, curvilinear, or irregular arrangement. For converters configured to produce glass vials, ampoules, jars, or other single opening containers, the secondary processing stations 112 are often referred to collectively as a bottom forming machine and can be operable to form bottom of the container.

The glass tube loading turret 110 can be positioned adjacent to the main turret 108 in a position from which the glass tube loading turret 110 is capable of loading a new length of glass tube 102 into the holders 130 of the main turret 108 in at least one processing station 106. In embodiments, the processing station 106 aligned with the glass tube loading turret 110 can be a tube loading station 214 (FIG. 2). When the converter 100 has converted all or at least a portion of the glass tube 102 at a specific holder position 136 into one or more glass articles, the glass tube loading turret 110 can deliver a new length of glass tube 102 through the top of the main turret 108 to the holder 130 at the holder position 136, when the holder position 136 indexes into alignment with the tube loading station 214 (FIG. 2). Alternatively or additionally, in embodiments, the converter 100 can include an arm (not shown) movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods and apparatuses for delivering new lengths of glass tube 102 to the main turret 108 are contemplated.

Referring now to FIG. 2, one embodiment of a converter 100 of the present disclosure is schematically depicted. As shown in FIG. 2, the plurality of processing stations 106 of the converter 100 can include, but are not limited to, one or more heating stations 202, forming stations 204, separating stations 206, polishing station 108, cooling stations 210, tube loading stations 214, discharge stations 216, measuring stations 218, tube length drop stations 220, other stations, and/or combinations of these stations.

FIG. 2 schematically depicts the arrangement of the processing stations 106 for a converter 100 having a main circuit 116 of sixteen processing stations 106 and a secondary circuit 118 of eight secondary processing stations 112, although more or fewer processing stations 106 and secondary processing stations 112 are contemplated. As previously described, the processing stations 106 of the main circuit 116 can be evenly spaced apart and evenly distributed about a circular circuit, and the secondary processing stations 112 of the secondary circuit 118 can also be evenly spaced apart and evenly distributed about a circular circuit.

The main circuit 116 of the converter schematically depicted in FIG. 2 can include one or more heating stations 202, one or more forming stations 204, a separating station 206, one or more cooling stations 210, a measuring station 218, a tube length drop station 220, a tube loading station 214, or other processing stations 106. With respect to the direction of indexing 222 of the main turret 108, heating stations 202 are generally positioned before each of the forming stations 204 and the separating stations 206 to preheat target regions of the glass tube 102 to a viscosity at which the glass becomes deformable and can be shaped or stretched and separated.

Referring again to FIG. 2, the forming stations 204 of the main turret 108 can be positioned downline of the separating station 106, one or more heating stations 202, or both in the direction of indexing 222. The forming stations 204 iteratively shape the glass tube 102 to form one or more features of the finished glass article. In particular, the forming stations 204 of the main turret 108 can be configured to shape the working end 150 (FIGS. 4 and 5) of the glass tube 102 to form features at one end of the glass articles 103. The forming stations 204 or polishing stations 208 of the secondary turret 114 can shape the other end of the glass article 103, such as the bottom of a vial, after the glass article 103 has been separated from the glass tube 102. In embodiments, the converter 100 can be used to produce vials from the glass tubes 102, and the forming stations 204 of the converter 100 may include one or more shoulder forming stations, flange forming stations, flange finishing stations, or combinations of these with one or more heating stations 202 positioned before and between each of the forming stations 204.

The main circuit 116 can further include a measuring station 218, at which at least one measurement device can be used to measure one or more attributes of the glass tube 102. Attributes of the glass tube can include but are not limited to one or more dimensions of the glass tube 102 or features of the glass article 103 formed by the forming stations 204, one or more cosmetic attributes of the glass tube 102 or glass article 103, or combinations thereof. The converter 100 can further include cooling stations 210, a tube length drop station 220, a tube loading station 214, or combinations of these between the forming stations 204 and the separating station 206. At the separating station 206, the partially formed glass article is separated from the glass tube 102 (FIG. 1). In the case of glass vials, ampoules, jars, and other single opening glass containers, the bottom of the container is concurrently formed during separation. The separating station 206 can also be the processing station 106 at which the partially formed glass article, once separated, is transferred to the secondary turret 114 (FIG. 1) to be indexed through the secondary circuit 118 of secondary processing stations 112.

Referring again to FIG. 2, the secondary processing stations 112 of the secondary circuit 118 may include one or more heating stations 202, forming stations 204, polishing stations 208, cooling stations 210, discharge stations 216, other processing stations, or combinations of secondary processing stations 112. The secondary turret 114 can rotate about the axis B in a direction 224 that is opposite from the main turret 108. In embodiments, the secondary turret 114 can rotate in a direction that is the same as the main turret 108. Although FIG. 2 depicts the secondary circuit as having a circular arrangement of the secondary processing stations 112, as previously discussed, the secondary circuit can have the secondary processing stations 112 positioned in other non-circular arrangements, such as linear, curvilinear, irregular-shaped, or other arrangements. In embodiments, the secondary processing stations 112 of the secondary circuit 118 can be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 can form the bottom of the vial. Other features are also contemplated such as those features characteristic of ampoules, cartridges, syringes, and the like. The secondary circuit 118 can include one or more polishing stations 208 to finish the surface of the glass article. The secondary circuit 118 can further include a plurality of cooling stations 210 and the discharge station 216, at which station the finished glass article 103 is discharged from the converter 100.

The previous description of the processing stations 106 of the main circuit 116 and the secondary processing stations 112 of the secondary circuit 118 is in the context of a converter 100 having 16 stations in the main circuit 116 and 8 stations in the secondary circuit 118. However, it is understood that more or fewer processing stations 106 and secondary processing stations 112 can be utilized to make vials having different shapes or features or other glass articles, such as cartridges, syringes, ampoules, or other pharmaceutical glass articles. Additionally, it is understood that the processing stations 106 and secondary processing stations 112 can be arranged in any of a number of different orders and/or configurations in order to produce differently shaped glass articles or differently sized glass articles.

Figure 3:
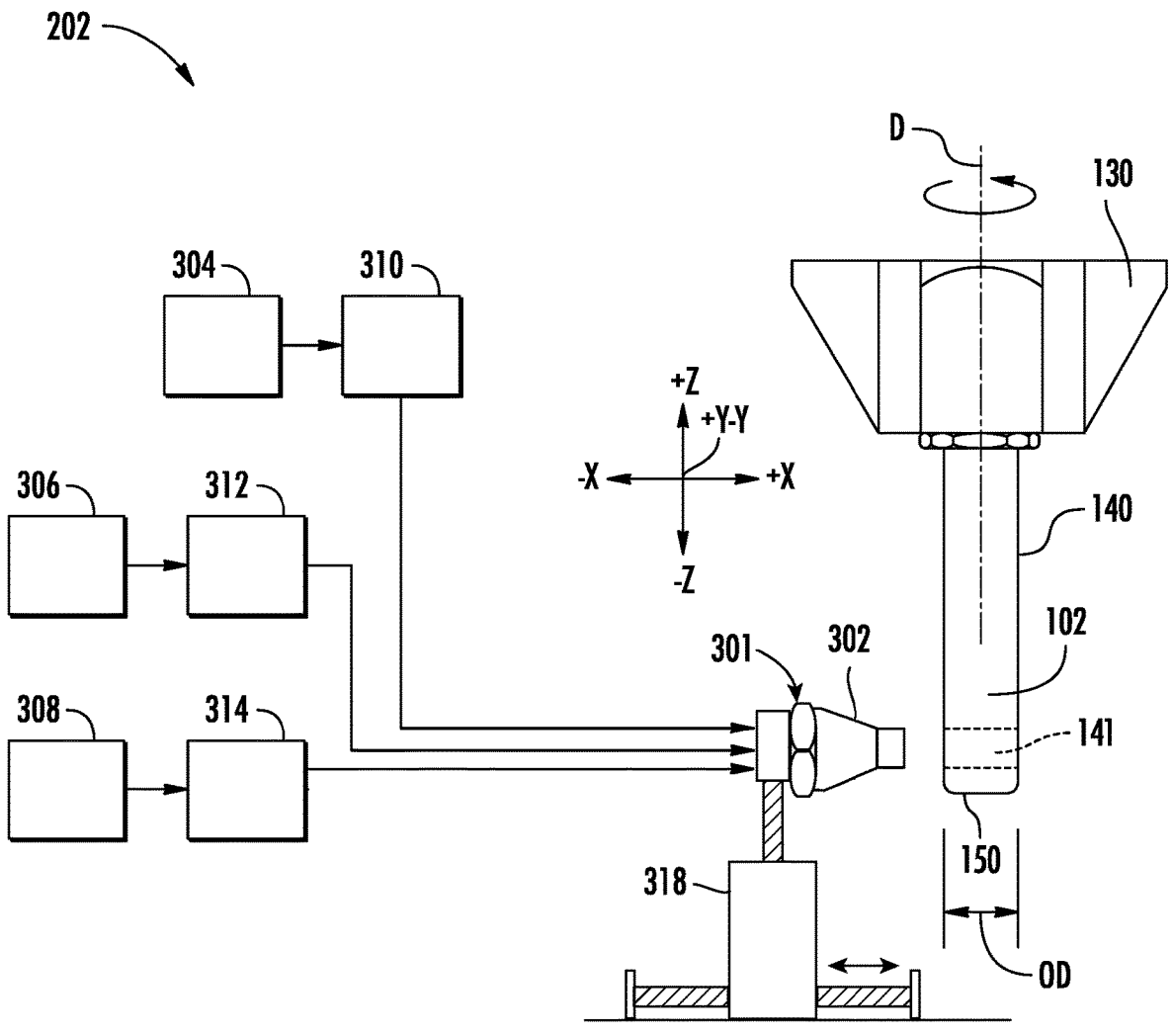
FIG. 3 schematically depicts a heating station of the converter of FIG. 1, according to one or more embodiments shown and described herein.

Referring now to FIG. 3, a heating station 202 of the converter 100 is schematically depicted. Each of the heating stations 202 include one or more heating elements 301. The heating stations 202 refer to processing stations in which a region of the glass tube 102 is heated by one or more of the heating element 301 to increase the temperature and/or decrease the viscosity of the glass without significantly changing the physical shape of the glass tube 102. The heating stations 202 do not include separating stations 206, in which the shape of the glass tube 102 is changed by removing a partially formed glass article from the working end of the glass tube 102. The heating stations 202 also do not include piercing stations 212, which change the shape of the glass tube 102 by piercing the meniscus of glass at the working end 150 of the glass tube 102.

As illustrated in FIG. 3, in embodiments, the heating element 301 can include one or more burners 302, which are used to heat targeted regions of the glass tube 102 prior to a forming operation performed at the forming station 204 (FIG. 2) or separating operation performed at the separating station 206 (FIG. 2). Although FIG. 3 depicts a single burner 302, it is understood that a plurality of burners 302 can be employed in a single heating station 202. Each burner 302 can be fluidly coupled to a fuel gas supply 304, an oxygen supply 306, and, optionally, an air supply 308. Examples of fuel gases for the burner 302 can include, but are not limited to hydrogen, hydrocarbon fuel gases such as methane, propane, and butane for example, other fuel gases, or combinations of these.

Each burner 302 can include a fuel control valve 310 to control the flow rate of fuel gas to the burner 302. Each burner 302 can also include an oxygen control valve 312 to control the mass flow rate of oxygen to the burner 302. Each burner 302 can further include an air control valve 314 for optionally controlling a flow rate of air to the burner 302. The burner 302 combusts the fuel gas in the presence of oxygen and/or air to produce a flame that heats at least the target region of the glass tube 102. Although the heating stations 202 of the converter 100 are described herein as heating the glass tube 102 using burners, it is understood that other heating elements or methods other than burners can be used to heat the glass tube 102. Other heating elements may include, but are not limited to, lasers such as $CO_2$ lasers for example, induction heaters, other heating devices, or combinations of these.

The heating station 202 can further include a burner positioner 318 coupled to the burner 302. The burner positioner 318 can be configured to positon the burner 302 vertically (e.g., in the +/−Z direction of the coordinate axis in FIG. 3), horizontally (e.g., in the X-Y plane identified by the coordinate axis in FIG. 3), or a combination of these directions relative to the glass tube 102 in the heating station 202. In embodiments, each burner positioner 318 can include one or a plurality of servo motors operable to adjust the position of the burner 302 in one or a plurality of directions automatically and/or incrementally. Any other type of positioner that is or will become commercially-available can be used for the burner positioner 318.

Figure 4:
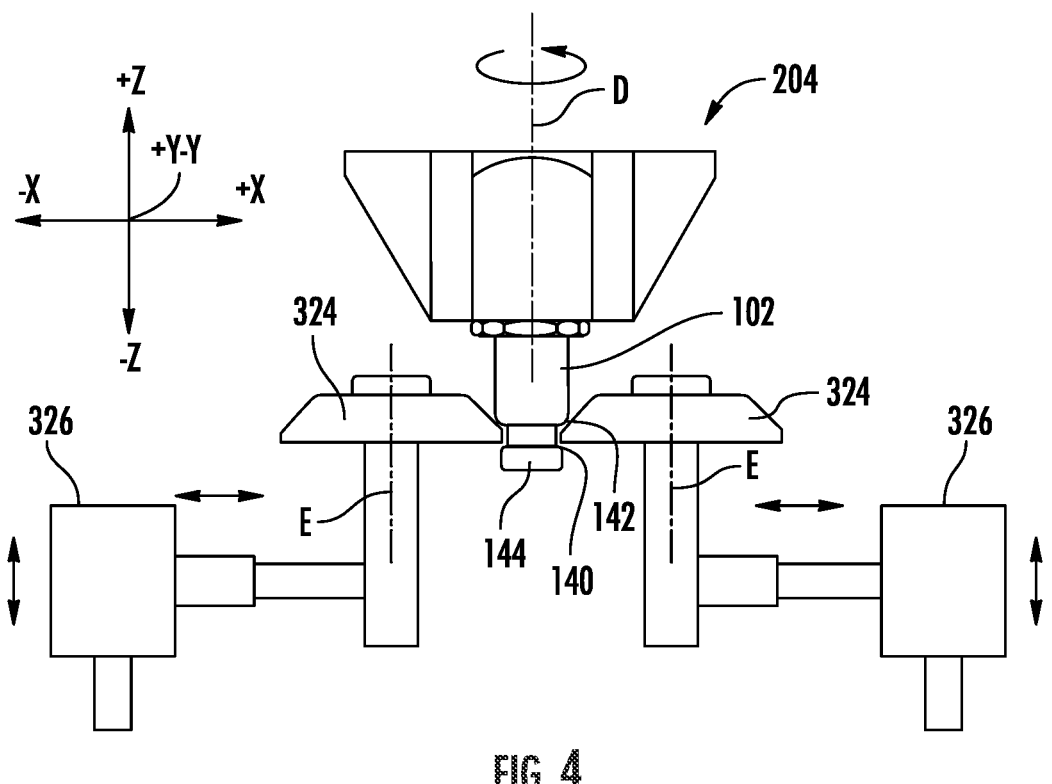
FIG. 4 schematically depicts one embodiment of a forming station of the converter of FIG. 1, according to one or more embodiments shown and described herein.
Figure 5:
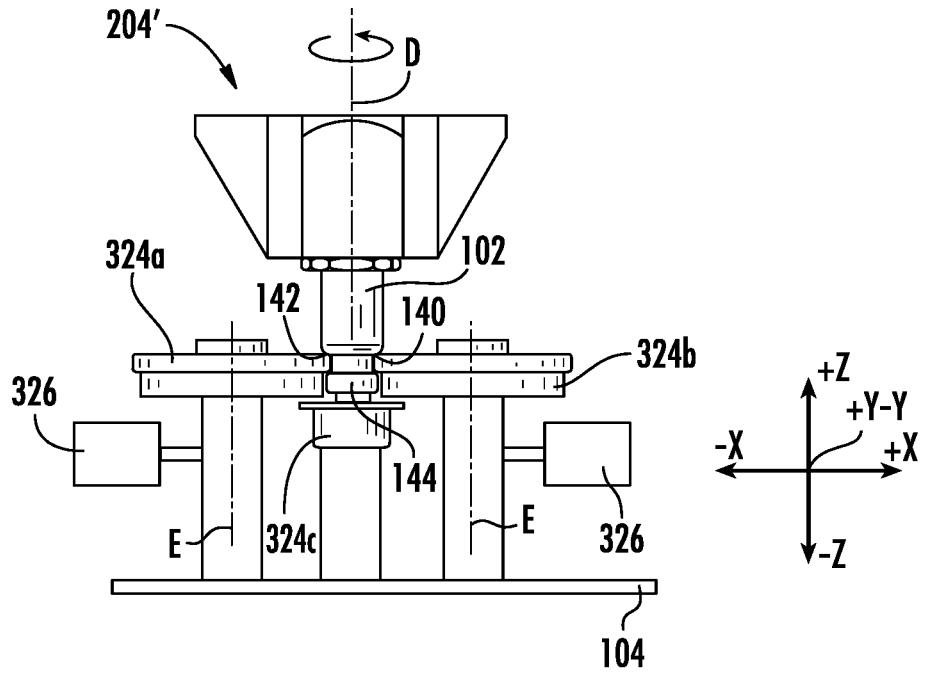
FIG. 5 schematically depicts another embodiment of a forming station of the converter of FIG. 1, according to one or more embodiments shown and described herein.

Referring now to FIGS. 4 and 5, examples of forming stations 204 of the converter 100 are schematically depicted. Forming stations 204 refer to processing stations in which one or more features of the glass article are formed proximate the working end 150 of the glass tube 102 through contact of the glass tube 102 with one or more forming tools 324, which are not burners or heating elements. Forming stations 204 do not include separating stations 206 or piercing stations 212. Each forming station 204 includes one or more forming tools 324 rotatable relative to the base 104 (FIG. 1) about tooling axis E. When passed into the forming station 204, the glass tube 102, which has been heated in a prior heating station 202 or in the separating station 206, is rotated by the holder 130. The forming tools 324 engage with the glass tube 102 as it rotates. When engaged, contact of the forming tools 324 with the heated glass tube 102 can form the glass tube 102 into the desired shape. The forming tools 324 can be contacted with the glass tube 102 for an active time of the forming tools 324. Upon expiration of the active time, the forming tool actuators 326 can withdraw the forming tools 324 from engagement with the glass tube 102. FIG. 4 schematically illustrates an embodiment of a forming station 204 for forming the shoulder 142 of a glass vial. FIG. 5 schematically depicts an exemplary embodiment of a forming station 204' for forming the flange 144 of a glass vial. The forming station 204' for forming the flange 144 comprises three forming tools 324a, 324b, and 324c. Other types of forming tools 324 may be employed in the forming station 204 depending on the desired features of the glass article 103.

Referring again to FIG. 4, the forming tool actuators 326 can be operable to move the forming tools 324 into and out of engagement with the glass tube 102. Moving the forming tools 324 into and out of engagement with the glass tube 102 can control the contact timing of the forming tools 324 with the glass tube 102. The contact timing of the forming tools 324 with the glass tube 102 refers to the timing of engaging and disengaging each of the forming tools 324 in a forming station 204 with the glass tube 102. Adjusting the contact timing of the forming tools 324 can adjust the total active time of each of the forming tools 324 in contact with the glass tube 102, the contact sequence of the forming tools 324 with the glass tube 102, or both. As previously discussed, the active time refers to the duration of time that at least one of the forming tools 324 is engaged or in contact with the glass tube 102. The contact sequence of the forming tools 324 with the glass tube 102 refers to the timing of the engagement and disengagement of each individual forming tool 324 of a forming station 204 with the glass tube 102. Referring to FIG. 5, in some cases, the contact sequence can be adjusted so that each of the forming tools 324a, 324b, and 324c initially contact the glass tube 102 at the same moment in time. In other instances, the contact sequence may be adjusted so that forming tool 324c (pin) contacts the inner surface of the glass tube 102 before or after the forming tools 324a and 324b (wheels) contact the outer surface of the glass tube 102 at the beginning of the active time. The contact sequence can also include the order of disengagement of each of the forming tools 324a, 324b, 324c from the glass tube 102 at the end of the active time. The term "contact timing" is intended to include both total active time and/or contact sequence of engagement of the forming tools 324 with the glass tube 102.

The forming tool actuators 326 can be operable to change the forming position the forming tools 324 vertically (e.g., in the +/−Z direction of the coordinate axis in FIG. 3), horizontally (e.g., in the X-Y plane identified by the coordinate axis in FIG. 4), or a combination of these directions relative to the glass tube 102 in the forming station 204. The forming position of the forming tools 324 refers to the forming tool position when the forming tool 324 are engaged with the glass tube 102. In embodiments, each forming tool actuator 326 can include one or a plurality of servo motors operable to automatically and/or incrementally adjust the positions of the forming tools 324 in one or a plurality of directions of the coordinate axis in FIG. 4. Any other type of positioner that is or will become commercially available can be used as at least a portion of the forming tool actuator 326.

Figure 6:
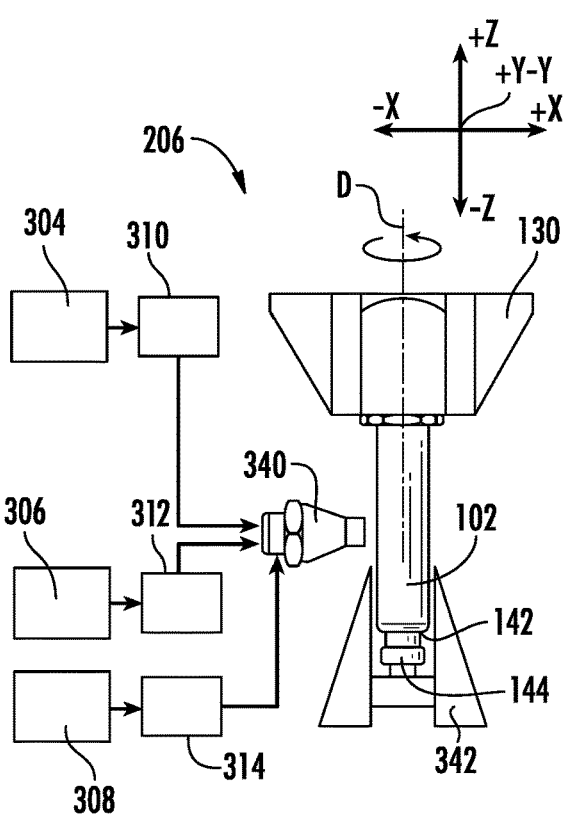
FIG. 6 schematically depicts a separating station of the converter of FIG. 1, according to one or more embodiments shown and described herein.

Referring now to FIG. 6, an embodiment of a separating station 206 of the converter 100 is schematically depicted. The separating station 206 depicted in FIG. 6 is a thermal separating station and can be positioned after one or more heating stations 202 in the direction of indexing 222 of the main turret 108. The heating stations 202 positioned before the separating station 206 heat the glass tube 102 at a separating region of the glass tube to make the glass viscous. The separating station 206 can include a separating burner 340. The separating burner 340 can have any of the features previously described for burners 302, including but not limited to a fuel gas control valve 310, an oxygen control valve 312, and/or an air control valve 314. Like the heating station 202, the separating station 206 can also include a burner positioner (not shown) coupled to the separating burner 340. The burner positioner can position the separating burner 340 vertically (e.g., in the +/−Z direction of the coordinate axis in FIG. 6), horizontally (e.g., in the X-Y plane identified by the coordinate axis in FIG. 6), or a combination of these directions relative to the glass tube 102 in the separating station 206. While the glass tube 102, which has been made viscously deformable by the previous heating stations 202, is rotated by the holder 130 about the center axis D, the separating burner 340 can be engaged with the outer surface 140 of the glass tube 102 at the separating region to heat the glass tube 102 to a temperature at which the viscosity of the glass causes the partially formed glass article to separate from the glass tube 102. Once separated from the glass tube 102, the partially formed article can be transferred to the secondary turret 114 (FIG. 1) or discharged from the converter 100. In embodiments, the partially formed glass article can be transferred to a secondary holder 342 for further processing on the secondary circuit 118.

FIGS. 3-6 include schematic illustrations of several different examples of processing stations 106 that may be utilized in the converter 100. However, it should be understood that other processing stations 106, such as but not limited to cooling stations, measuring stations, polishing stations, or other processing stations 106, having different structures, combinations of structures, or functions, may be utilized to achieve the desired conversion of the glass tube 102 into one or more glass articles.

Figure 7:
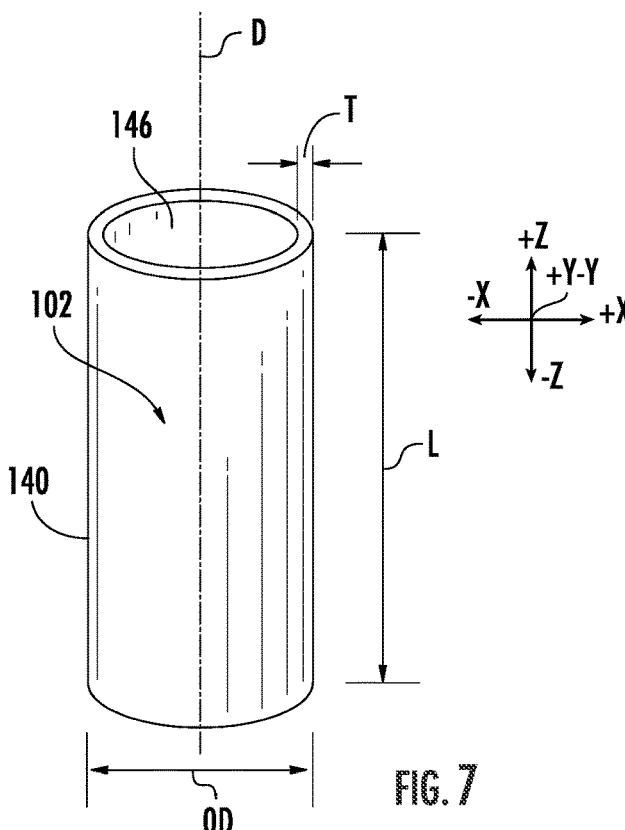
FIG. 7 schematically depicts a perspective view of a section of a glass tube prior to conversion in the converter of FIG. 1, according to one or more embodiments shown and described herein.

Referring now to FIG. 7, the glass tube 102 comprises an elongated hollow cylindrical tube made from glass. The glass tube 102 has an annular cross-sectional shape and comprises an outer surface 140, an inner surface 146, and a thickness t. The thickness t of the glass tube 102 refers to a radial distance between the inner surface 146 and the outer surface 140 of the glass tube 102. The glass tube 102 can have a length L measured in the +/−Z direction of the coordinate axis of FIG. 7. The length L of the glass tube 102 decreases as the glass articles 103 are progressively removed from the working end 150 of the glass tube 102 during the converting process. The glass tube 102 has have an outside diameter OD as shown in FIG. 7. As previously discussed, the glass tube 102 is rotated about center axis D of the glass tube 102 throughout the converting process. The working end 150 of the glass tube 102 is the end of the glass tube 102 that is oriented in the −Z direction of the coordinate axis in FIG. 7 when the glass tube 102 is secured in the holder 130 of the converter 100. The non-working end of the glass tube 102 is the end opposite the working end 150 (i.e., the end of the glass tube 102 in the +Z direction of the coordinate axis of FIG. 10. Although the working end 150 is shown as the downward most end of the glass tube 102, it is understood that the converter 100 can be configured to orient the working end 150 of the glass tube 102 in the upward direction, a horizontal direction, or other direction.

Referring again to FIGS. 1 and 2, the converter 100 can be an indexing converter in which each of the plurality of processing stations 106 is stationary and the converter 100 indexes the glass tube 102 through each of the plurality of processing stations 106 in succession. In operation, the converter 100 indexes the glass tubes 102, which are secured in the holders 130, into a processing station 106. A specific operation, such as heating, forming, separating, cooling, polishing, dropping, loading, measuring, etc. may be performed on the glass tubes 102 at each of the processing stations 106. The converter 100 can be tuned so that all of the processing stations 106 complete their operations within the dwell time. At the end of the dwell time, the converter 100 indexes the glass tubes 102 to the next processing stations 106 in the main circuit 116. For an indexing converter, the total time per part per station, as used in this disclosure, is the sum of the dwell time and the index time. At the separating station 206, the partially finished glass article 103 is separated from the working end 150 of the glass tube 102 and transferred to a secondary processing station 112 in the secondary circuit 118.

Examples of converters 100 for converting glass tube 102 into glass vials include the Vial Forming Machine Models RP16 or RP18 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098. Vial Forming Machine manufactured by Euromatic S.R.L., which has 36 processing stations. Another example may include the Zeta 103 Cartridge Forming Machine manufactured by Euromatic S.R.L., which is a converter for converting glass tube into glass cartridges. The cartridge converter has similar characteristics to the previously described vial converters 100 but the cartridge converter is utilized to produce glass articles having a glass cartridge form factor rather than a glass vial.

Although described in the context of a converter 100 for producing glass vials from glass tube 102, it should be understood that the converter 100 described herein can be configured to produce one or more other articles, such as other types of pharmaceutical containers or articles, by changing the forming tools 324 and/or the order or configuration of processing stations 106 in the main circuit 116 or secondary processing stations 112 in one or more secondary circuits 118. Pharmaceutical articles can include, but are not limited to vials, cartridges, syringes, ampoules, jars, or other glass pharmaceutical articles. In embodiments, the converter 100 disclosed herein can be configured to produce single-opening glass containers, such as but not limited to vials, ampoules, jars, or other glass containers where the bottom of the glass container is formed through thermal separation of the glass article from the working end 150 of the glass tube 102.

Referring again to FIG. 6, during thermal separation of the partially formed glass article 103 from the working end 150 of the glass tube 102 in the separating station 206, the glass is heated by the separation burner 348 until the glass is viscous enough for the glass article to separate from the working end 150 of the glass tube 102. In embodiments, the viscosity of the glass can be such that the force of gravity alone can be sufficient to cause the partially formed glass article to separate from the working end 150 of the glass tube 102. In embodiments, the partially finished glass article 103 can be drawn downward to separate the partially finished glass article 103 from the glass tube 102. Thermal separation in the separating station 206 results in forming a glass film over the upward facing end of the partially formed glass article 103 and on the new working end 150 of the glass tube 102. The glass film on the upward facing end of the partially formed glass article 103 forms the bottom of glass articles comprising vials, ampoules, jars, and other single-opening containers. On the working end 150 of the glass tube 102, the glass film closes the working end 150 of the glass tube 102. As used throughout the present disclosure, the term "meniscus" is used to refer to the glass film formed horizontally (e.g., perpendicular to the center axis D of the glass tube 102) across the working end 150 of the glass tube 102. Before further heating and forming the next glass article 103 at the working end 150 of the glass tube 102, the meniscus of glass at the working end 150 must be pierced to re-open the working end 150 of the glass tube 102.

Figure 8:
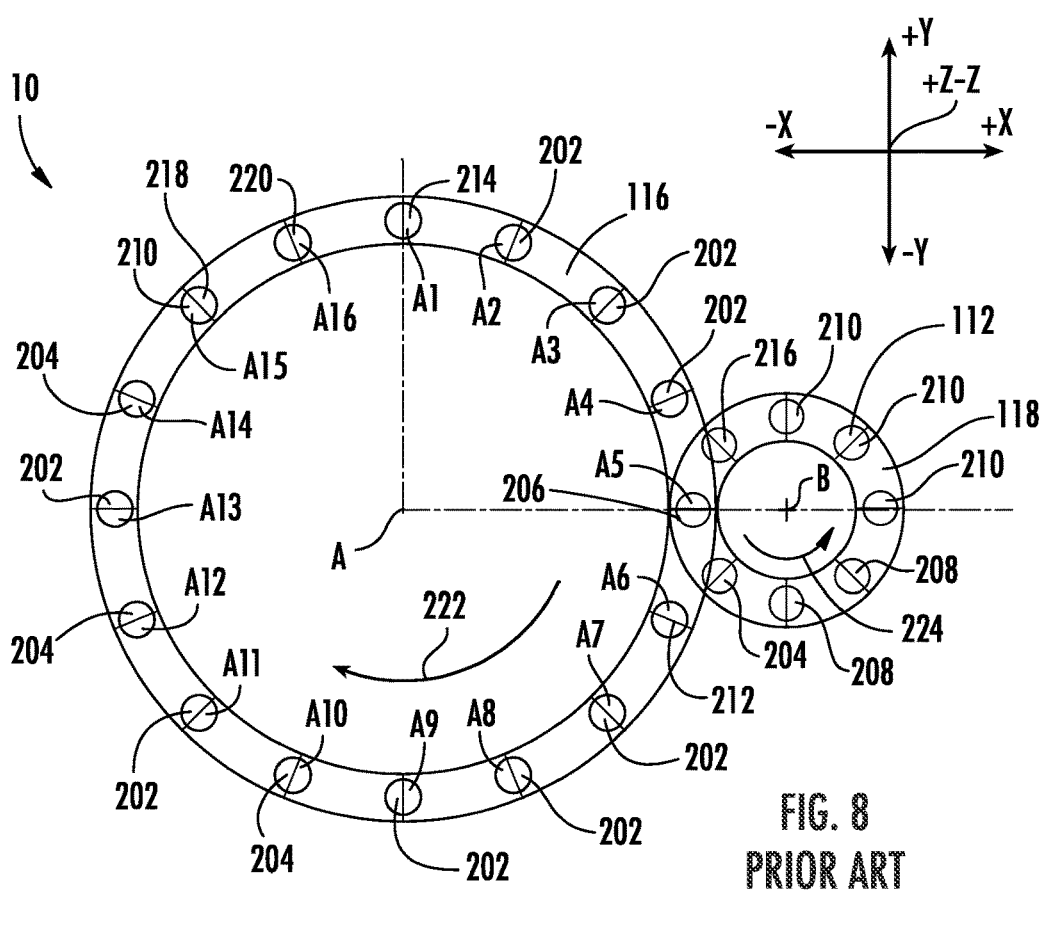
FIG. 8 schematically depicts a top view of a main turret and a secondary turret of a converter of the prior art.
Figure 9:
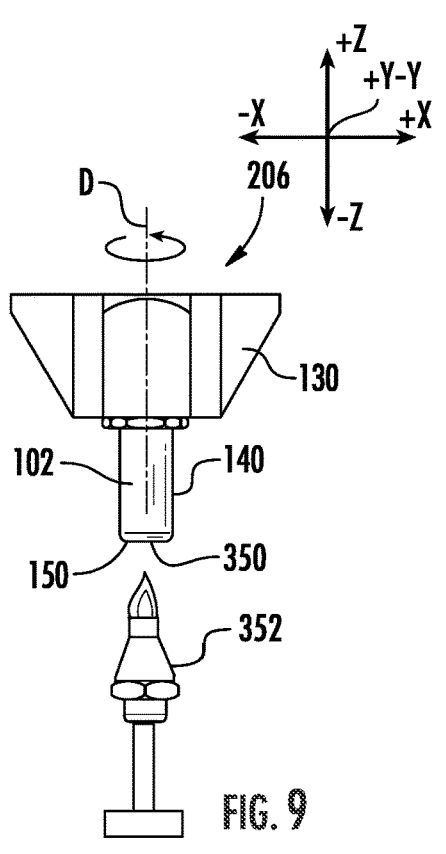
FIG. 9 schematically depicts a piercing station of the converter of FIG. 8, according to one or more embodiments shown and described herein.

Referring now to FIG. 8, a top view of a conventional converter 10 is schematically depicted. In the conventional converter 10, the main circuit 116 includes a piercing station 212 (e.g., station A6 in FIG. 8) immediately downline from the separating station 206 in the direction of indexing 222 of the main turret 108. Referring now to FIG. 9, a front view of a piercing station 212 of the conventional converter 10 is schematically depicted. As used herein, a "piercing station" refers to a processing station 106 in which the meniscus 350 of glass at the working end 150 of the glass tube 102 is pierced during the dwell time of the converter 100. The piercing station 212 can include a piercing burner 352 oriented to direct a flame into contact with the meniscus 350 of glass at the working end 150 of the glass tube 102. During operation, the conventional converter 10 indexes the glass tube 102 from the separating station 206 directly to the piercing station 212. In the piercing station 212, the meniscus 350 (FIG. 8) of the glass tube 102 previously formed in the separating station 206 is pierced through contact with the flame of the piercing burner 352 in the piercing station 212, thereby reopening the working end 150 of the glass tube 102.

Piercing the meniscus 350 of glass at the working end 150 of the glass tube 102 takes a very short amount of time that is much less than the dwell time of the converter 100 and less than the index time. Other processing stations 106, such as heating stations 202, forming stations 204, and the separating station 206 can require the entire dwell time to conduct the processing step in those processing stations 106. The heating stations 202, forming stations 204, separating station 206, or combinations of these can be time limiting steps that determine the dwell time of the converter 100, and thereby the overall part rate.

The converter 100 of the present disclosure better utilizes the dwell time of the converter 100 by piercing the meniscus 350 at the working end 150 of the glass tube 102 while indexing the glass tube 102 from the separating station 206 to the next processing station 106 immediately downline from the separating station 206. This enables the processing station 106 immediately downline from the separating station 206 to be reallocated from a piercing station 212 to an auxiliary processing station directly downline from the separating station 206. The auxiliary processing station can be either a heating station 202 or a forming station 204. Thus, the dwell time from the piercing station 212 can be re-allocated to a rate limiting processing step, such as heating in a heating station 202 and/or forming in a forming station 204. Re-allocation of the processing station 106 immediately downline from the separating station 206 from a piercing station 212 to an auxiliary processing station can also enable greater flexibility in the arrangement of the processing stations 106 to enable the converter 100 to produce a greater variety of different shapes and sizes of glass articles 103.

Figure 10:
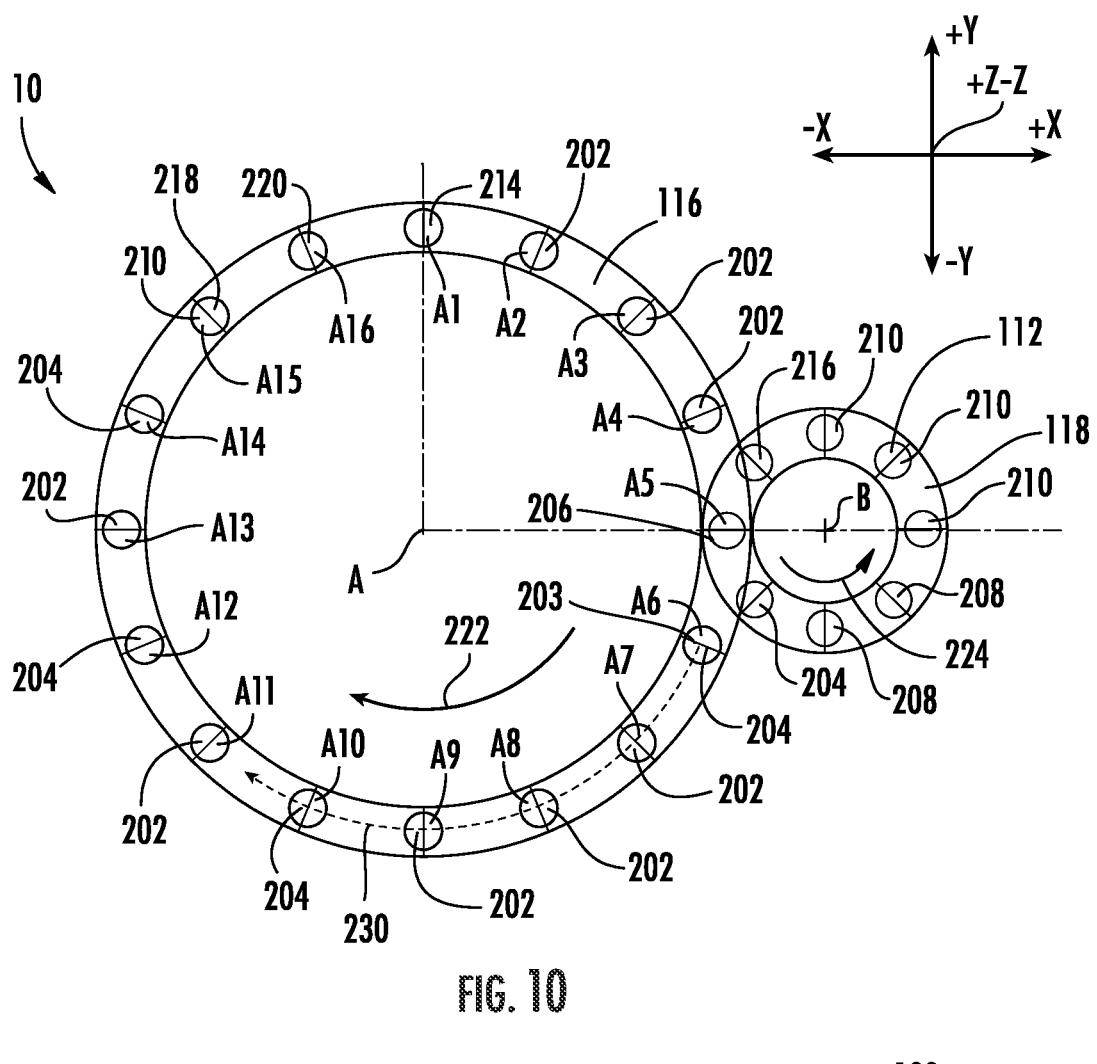
FIG. 10 schematically depicts a top view of a main turret and a secondary turret of the converter of FIG. 1 where the auxiliary processing station is a forming station, according to one or more embodiments shown and described herein.

Referring now to FIGS. 2 and 10, the converter 100 of the present disclosure includes an auxiliary processing station 203 disposed immediately downline from the separating station 206. The auxiliary processing station 203 is a stationary processing station disposed directly downline and immediately adjacent to the separating station 206. The auxiliary processing station 203 can be a heating station 202 (FIG. 2) or a forming station 204 (FIG. 10) disposed immediately downline from the separating station 206. The converter 100 further includes a piercing device 400 disposed between the separating station 206 and the auxiliary processing station 203. Referring to FIG. 2, in embodiments, the auxiliary processing station 203 can be a heating station 202 disposed directly downline from the separating station 206 (station A5). Referring now to FIG. 10, in embodiments, the auxiliary processing station 203 can be a forming station 204 (station A6) disposed directly downline from the separating station 206 (station A5). Since the working end 105 of the glass tube 102 is heated in the separating station 206 to a temperature at which the glass becomes viscous and can be formed, the glass tube 102 can, in some embodiments, be passed directly from the separating station 206 to a forming station 204 and contacted with forming tools without further heating in an intervening heating station 204. The auxiliary processing station 203 is not a piercing station 212.

Referring again to FIGS. 2 and 10, the piercing device 400 is positioned to pierce the meniscus 350 at the working end 150 of the glass tube 102 while the converter 100 indexes the glass tube 102 between the separating station 206 and the auxiliary processing station 203 or during the index time of the converter 100. As previously discussed, the index time of the converter 100 is the duration of time during which the glass tube 102 is translated from one processing station 106 to the next immediately adjacent processing station 106. In the converter 100 disclosed herein, the meniscus 350 at the working end 150 of the glass tube 102 is pierced while indexing the glass tube 102 between the separating station 206 and the auxiliary processing station 203 during the index time. Piercing the meniscus 350 of the glass tube 102 can include passing the glass tube 102 into and through engagement with the piercing device 400 disposed between the separating station 206 and the auxiliary processing station 203.

The piercing device 400 is positioned so that the piercing device 400 does not pierce the meniscus 350 of the glass tube 102 during the dwell time of the converter 100. As previously discussed, the dwell time is the duration of time that the glass tube 102 spends in a particular processing station 106 before being translated to the next subsequent processing station 106. The auxiliary processing station 203 is directly downline from the separating station 206 so that the converter 100 does not include any processing stations 106 that (1) are configured to process the working end 150 of the glass tube 102 during the dwell time of the converter 100; and (2) are disposed between the separating station 206 and the auxiliary processing station 203.

Figure 11:
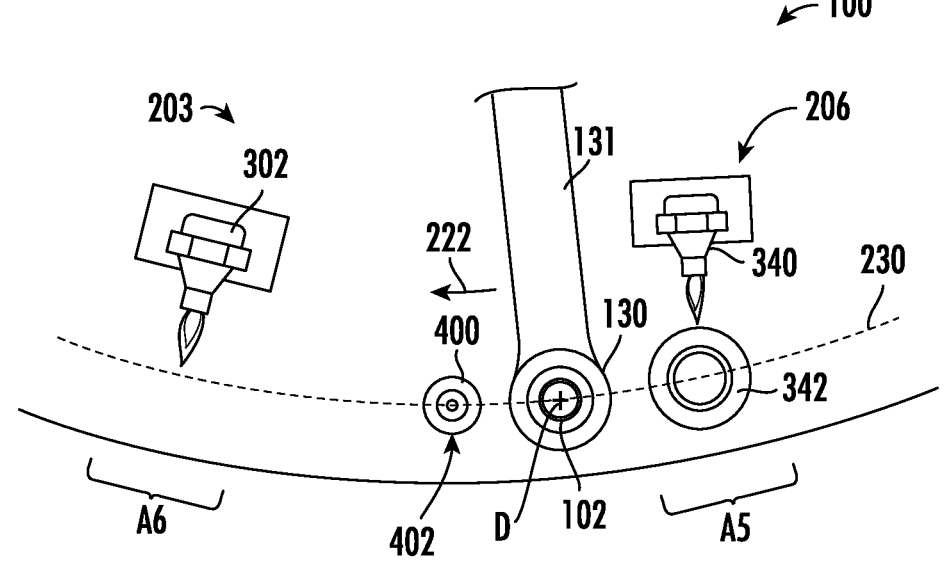
FIG. 11 schematically depicts a top view of a portion of the main turret of the converter of FIG. 2 comprising a separating station, the auxiliary processing station downline from the separating station, and a piercing device disposed along the path of travel of the glass tube there between, according to one or more embodiments shown and described herein.
Figure 12:
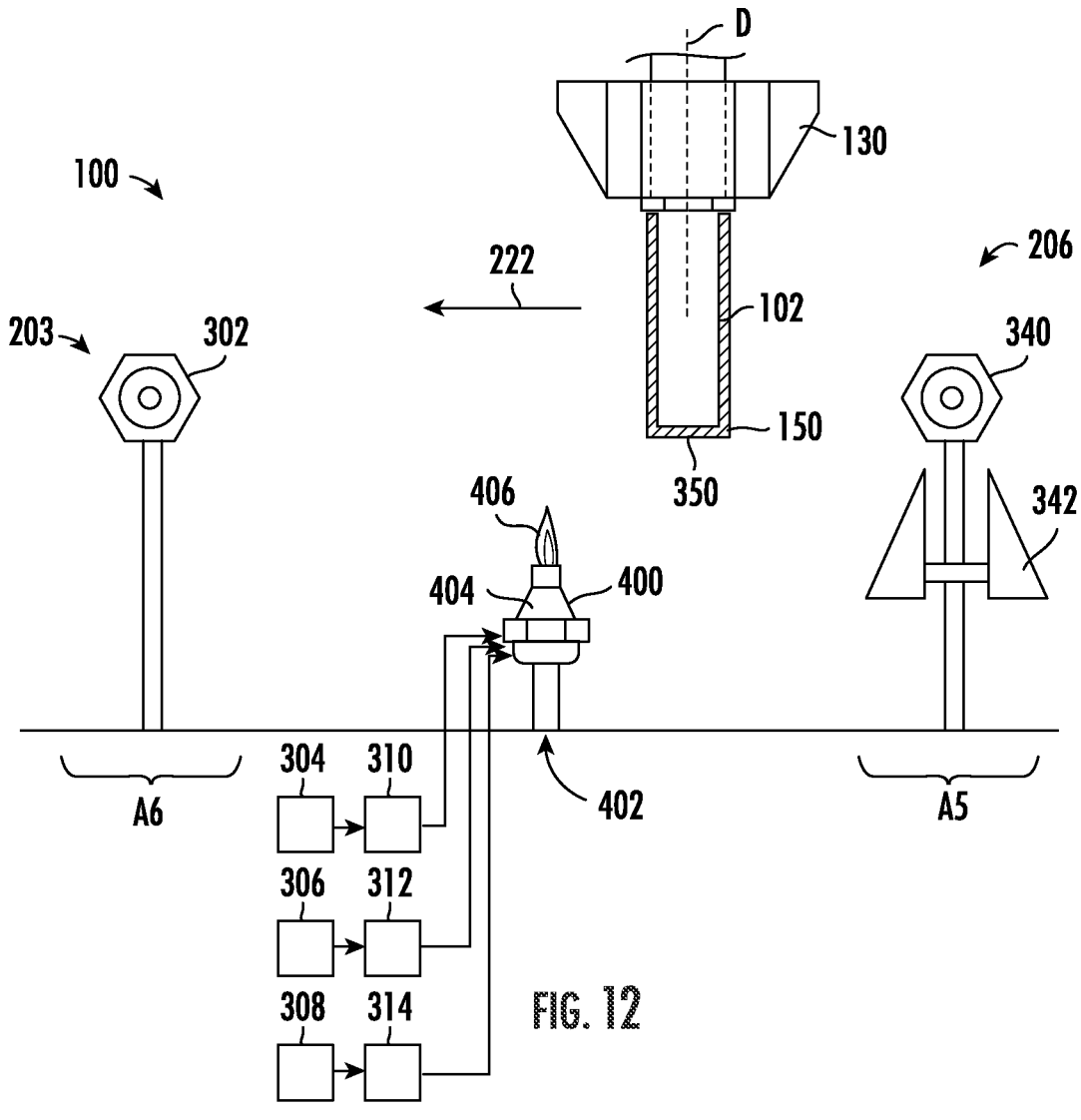
FIG. 12 schematically depicts a side view of the portion of the main turret of FIG. 11, according to one or more embodiments shown and described herein.
Figure 13:
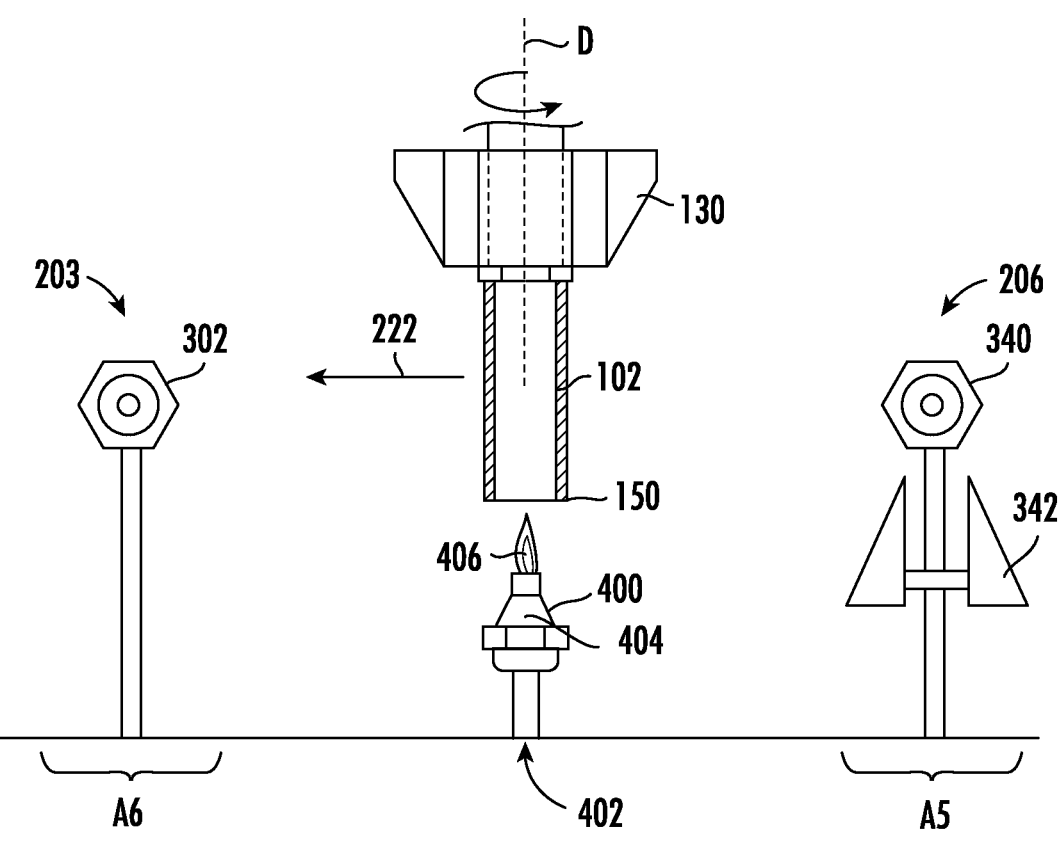
FIG. 13 schematically depicts a side view of the portion of the main turret of FIG. 11 with a glass tube translated into engagement with the piercing device, according to one or more embodiments shown and described herein.

Referring now to FIGS. 11-13, one embodiment of a portion of the converter 100 comprising the auxiliary processing station 203 disposed directly downline from the separating station 206 is schematically depicted. Although embodiments disclosed herein will be described in the context of the auxiliary processing station 203 being a heating station 202 disposed directly downline from the separating station 206, it is understood that the concepts disclosed herein are equally effective for converters in which the auxiliary processing station 203 is a forming station 204 disposed directly downline from the separating station 206. Referring to FIGS. 11 and 12, the piercing device 400 can be positioned between the separating station 206 and the auxiliary processing station 203 in a path of travel 230 of the glass tube 102 between the separating station 206 and the auxiliary processing station 203. In embodiments, the piercing device 400 can be positioned below the glass tube 102. Piercing the meniscus 350 of the glass tube 102 can comprise translating the glass tube 102 over the piercing device 400 positioned below the path of travel 230 of the glass tube 102 between the separating station 206 and the auxiliary processing station 203.

The piercing device 400 can be any device capable of piercing the meniscus 350 formed at the working end 150 of the glass tube 102. Piercing devices 400 suitable for piercing the meniscus 350 can include but are not limited to piercing burners, lasers, suction devices, positive airflow devices, mechanical devices, or combinations of these. Referring to FIG. 12, in embodiments, the piercing device 400 can comprise at least one piercing burner 404. The piercing burner 404 can be positioned below the working end 150 of the glass tube 102 and can be oriented toward the working end 150 of the glass tube 102. The position and orientation of the piercing burner 404 can cause the flame 406 from the piercing burner 404 to extend upward into engagement with the meniscus 350 of the glass tube 102. In other words, the at least one piercing burner 404 can be positioned to direct the flame 406 towards the meniscus 350 at the working end 150 of the glass tube 102 when the glass tube 102 is translated past the piercing burner 404.

The piercing burner 404 can be fluidly coupled to one or more of a fuel gas supply 304, oxygen supply 306, air supply 308, or combinations of these. The fuel gas supply 304, the oxygen supply 306, and the air supply 308 were previously discussed in relation to the burner 302 of FIG. 3. The piercing burner 404 can also include a fuel gas control valve 310, oxygen control valve 312, and/or air control valve 314 for controlling heat output from the piercing burner 404. Referring now to FIGS. 12 and 13, when the converter 100 translates the glass tube 102 over the piercing burner 404 along the path of travel 230 from the separating station 206 to the auxiliary processing station 203, the flame 406 from the piercing burner 404 heats and pierces the meniscus 350 to re-open the working end 150 of the glass tube 102.

In embodiments, the meniscus 350 can be pierced by directing a stream of gas, such as compressed air, nitrogen, argon, or other gas, at the meniscus 350 or across the meniscus 350. In embodiments, a suction device can be used to create a negative pressure great enough to pierce the meniscus 350. In embodiments, mechanical means or other methods may be used to pierce the meniscus 350 instead of using a piercing burner 352. Various methods of piercing the meniscus 350 are disclosed in U.S. Pat. No. 10,968,133, entitled "METHODS FOR MINIMIZING SHR IN GLASS ARTICLES BY PRODUCING A GAS FLOW DURING PHARMACEUTICAL PART CONVERTING," granted Apr. 6, 2021; co-pending U.S. application Ser. No. 16/197,187, entitled "SYSTEMS AND METHODS FOR MINIMIZING SHR FROM PIERCING DURING PHARMACEUTICAL PART CONVERTING USING A GAS FLOW," filed Nov. 20, 2018; co-pending U.S. application Ser. No. 16/197,971, entitled "SYSTEMS AND METHODS FOR MINIMIZING SHR FROM PIERCING DURING PHARMACEUTICAL PART CONVERTING USING NEGATIVE PRESSURE EVACUATION," filed Nov. 21, 2018; and co-pending U.S. application Ser. No. 16/198,041, "SYSTEMS AND METHODS FOR MINIMIZING SHR FROM PIERCING FROM PHARMACEUTICAL PART CONVERTING USING PULSED EJECTION," filed Nov. 21, 2018, the entire contents of all of which are incorporated by reference in the present disclosure.

Referring again to FIGS. 11 and 12, in embodiments, the piercing device 400 can be coupled to the converter 100 at a fixed position 402 along the path of travel 230 of the glass tube 102 from the separating station 206 to the auxiliary processing station 203. The converter 100 can be operable to translate the glass tube 102 in continuous motion from the separating station 206, past the fixed position 402 of the piercing device 400, to the auxiliary processing station 203. Reference number 222 in FIGS. 11 and 12 indicates the direction of travel of the glass tube 102 and holder 130 along the path of travel 230 of the glass tube 102. Referring now to FIG. 13, as the glass tube 102 is translated past the fixed position 402 of the piercing device 400, the meniscus 350 at the working end 150 of the glass tube 102 is passed into and out of engagement with the piercing device 400. The contact time of the piercing device 400 with the meniscus 350 of the glass tube 102 can depend on the cross-sectional size of the glass tube 102 and the linear speed at which the converter 100 translates the glass tube 102 between the separating station 206 and the auxiliary processing station 203 during the index time. Piercing the meniscus 350 can include maintaining the piercing device 400 at the fixed position 402 and translating the glass tube 102 past the piercing device 400 at the fixed position 402. The movement of the glass tube 102 passes the working end 150 of the glass tube 102 into engagement with the piercing device 400 and back out of engagement with the piercing device 400. Referring to FIG. 13, the piercing device 400 pierces the meniscus 350 to open the working end 150 of the glass tube 102 as the glass tube 102 is translated by the piercing device 400.

Referring again to FIG. 12, in embodiments, the piercing device 400 can be the piercing burner 404. The piercing burner 404 can be a single point burner having a single flame 406 that converges at a point above the piercing burner 404. The piercing burner 404 can be positioned so that the flame 406 of the piercing burner 404 is aligned with the center axis D of the glass tube 102 when the glass tube 102 passes over the piercing burner 404. As the glass tube 102 is translated over the fixed position 400 of the piercing burner 404, the single point flame of the piercing burner 404 can contact the meniscus 350 along a diameter of the glass tube 102 intersecting the center axis D of the glass tube 102. Aligning the piercing burner 404 with the center axis D of the glass tube 102 can provide the greatest contact time of the flame 406 of the piercing burner 404 with the meniscus 350 by ensuring that the flame 406 of the piercing burner 404 is in contact with the meniscus 350 over a distance equal to the diameter of the glass tube 102. Positioning the piercing burner 404 so that the piercing burner 404 is not aligned with the center axis D of the glass tube 102 can reduce the contact time of the piercing burner 404 with the meniscus 350.

When the piercing device 400 is a piercing burner 404, the heat output of the piercing burner 404 can be adjusted so that the flame 406 of the piercing burner 404 pierces the meniscus 350 at the working end 150 of the glass tube 102 during the contact time of the flame 406 with the meniscus 350. The heat output of the piercing burner 404 can be increased or decreased by adjusting one or more of the fuel gas control valve 310, oxygen control valve 312, and/or air control valve 314. As the index speed increases, the heat output of the piercing burner 404 can be increased to shorten the contact time needed for the flame 406 of the piercing burner 404 to pierce the meniscus 350. As the index speed decreases, the heat output of the piercing burner 404 can be reduced to minimize exposure of the interior of the glass tube 102 to the heat from the piercing burner 404 after the meniscus 350 is pierced but the glass tube 102 is still moving over the piercing burner 404.

Figure 14:
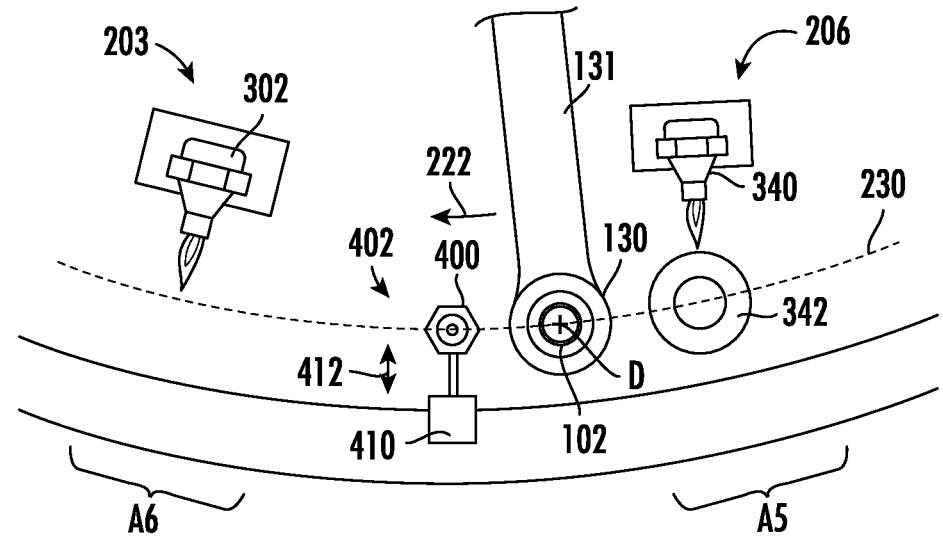
FIG. 14 schematically depicts a top view of another embodiment of a piercing device disposed between the separating station and the auxiliary processing station of the converter of FIG. 2, according to one or more embodiments shown and described herein.

Referring now to FIG. 14, the converter 100 can further include a piercing device actuator 410 operatively coupled to the piercing device 400. The piercing device actuator 410 can be operable to translate the piercing device 400 into and out of the fixed position 402, at which the piercing device 400 engages the meniscus 350 at the working end 150 of the glass tube 102 when the glass tube 102 is translated past the fixed position 402. The piercing device actuator 410 may be any type of suitable actuator capable of translating the piercing device 400 into or out of the fixed position 402 through linear movement or rotational movement. Examples of piercing device actuators 410 can include but are not limited to one or more servomotors, hydraulic actuators, or other type of actuator capable of linear or rotational translation of the piercing device 400 into and out of the fixed position 402.

Piercing the meniscus 350 can include translating the piercing device 400 into and out of the fixed position 402, at which the piercing device 400 can engage the meniscus 350 at the working end 150 when the glass tube 102 is passed by the fixed position 402. Reference number 412 indicates the direction of motion of the piercing device actuator 410 in FIG. 14. Although shown as translating the piercing device 400 in a linear direction, it is understood that the piercing device actuator 410 can also be configured to rotate the piercing device 400 into and out of the fixed position 402.

In certain circumstances, the rate at which the converter 100 moves the glass tube 102 between the separating station 106 and the auxiliary processing station 203 during the index time can be too rapid for one single-point piercing burner 404 to pierce the meniscus 350 during the contact time of the piercing burner 404 with the meniscus 350. In other words, the linear speed of the glass tube 102 past the piercing burner 404 can be great enough that the contact time of the flame 406 with the meniscus 350 is not long enough to pierce the meniscus 350. In these cases, a plurality of piercing burners 404 can be used to pierce the meniscus 350.

Figure 15:
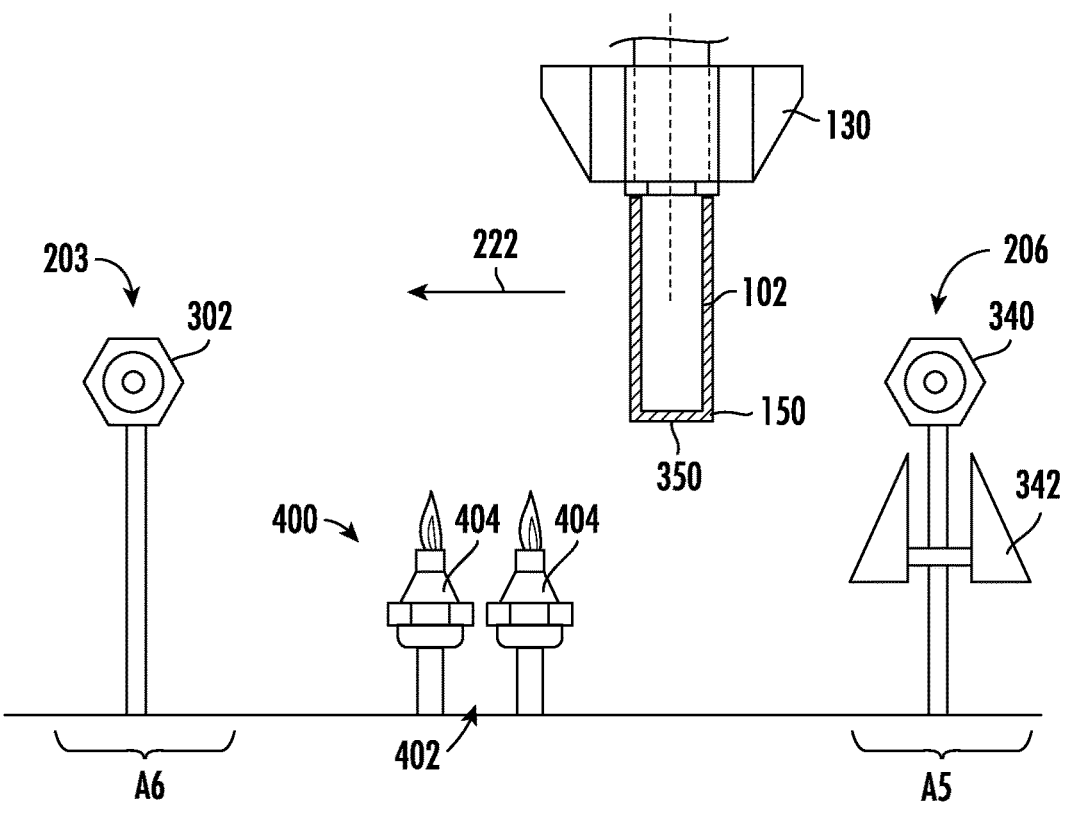
FIG. 15 schematically depicts a side view of a portion of the main turret of the converter of FIG. 2 that includes an embodiment of a piercing device comprising a plurality of piercing burners, according to one or more embodiments shown and described herein.
Figure 16:
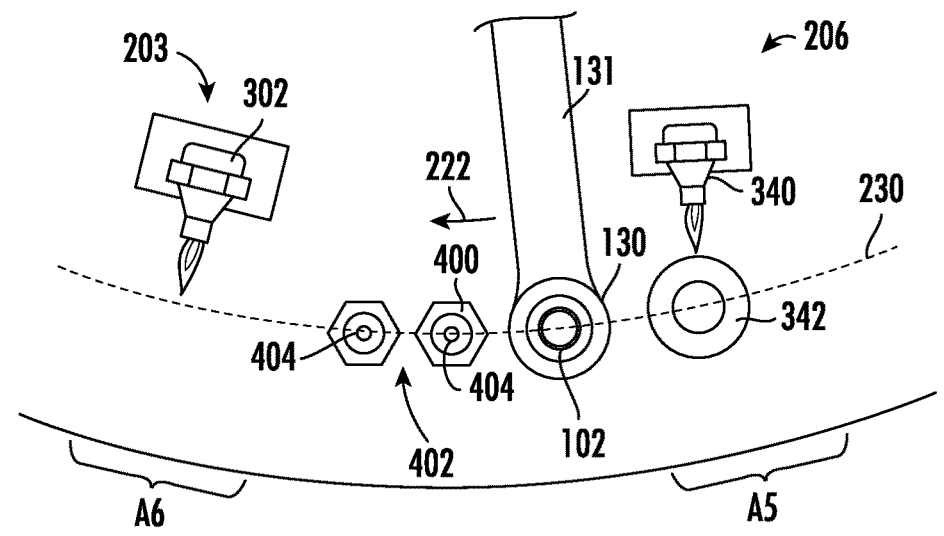
FIG. 16 schematically depicts a top view of the portion of the main turret of FIG. 15, according to one or more embodiments shown and described herein.

Referring now to FIGS. 15 and 16, in embodiments, the piercing device 400 can include a plurality of piercing burners 404 arranged in succession along the path of travel 230 of the glass tube 102 from the separating station 206 to the auxiliary processing station 203. Although shown in FIGS. 15 and 16 has having two piercing burners 404, it is understood that the converter 100 can have more than two piercing burners 404. The converter 100 can include 1, 2, 3, 4, or more than 4 piercing burners 404 arranged in succession along the path of travel 230 of the glass tube 102. The piercing burners 404 can be placed as close as possible in succession to reduce or eliminate any cooling of the glass of the meniscus 350 between piercing burners 404. In embodiments, each of the plurality of piercing burners 404 can be centered on the path of travel 230 of the glass tube 102 so that the flames 406 of each of the piercing burners 404 contact the meniscus 350 along the diameter of the glass tube 102 (e.g., such that the centers of the flames 406 of the plurality of piercing burners 404 pass through the center axis D of the glass tube 102 when the glass tube 102 passes over the piercing burners 404). The converter 100 can be operable to pass the glass tube 102 into and through engagement with the plurality of the piercing burners 404 arranged successively along the path of travel 230 of the glass tube 102 from the separating station 206 to the auxiliary processing station 203.

Figure 17:
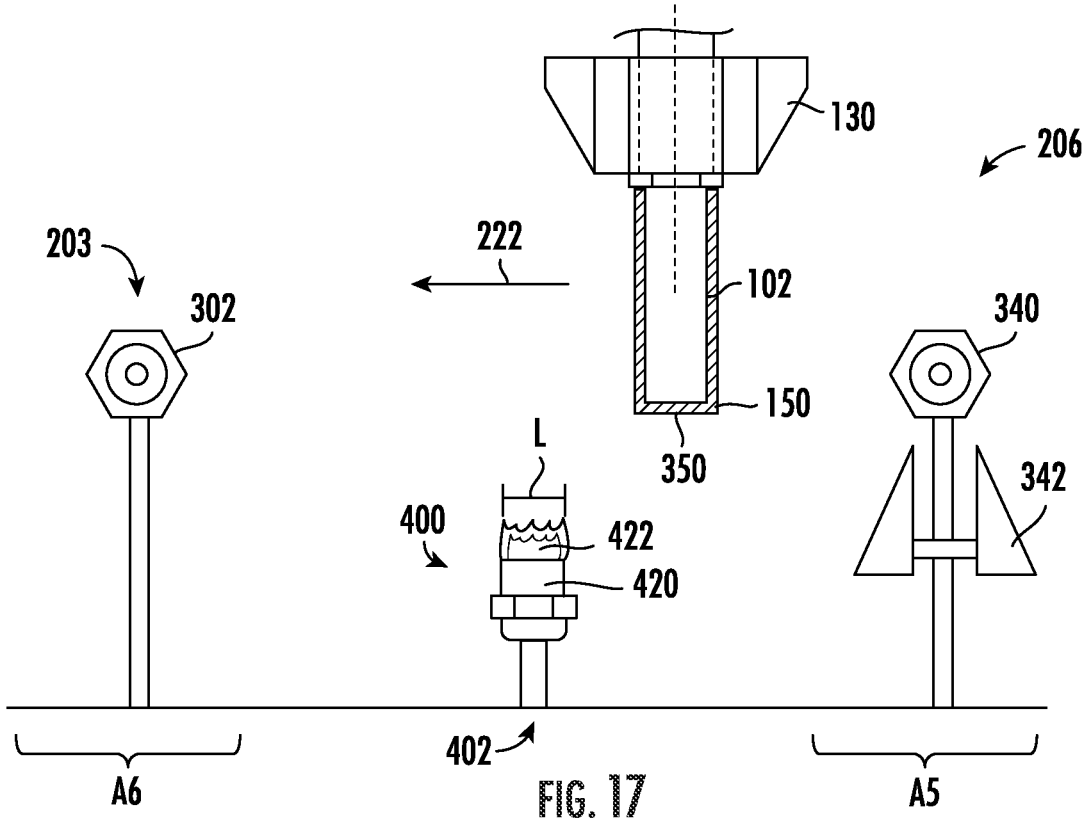
FIG. 17 schematically depicts a side view of a portion of the main turret of the converter of FIG. 2 that includes still another embodiment of a piercing device comprising a shaped piercing burner, according to one or more embodiments shown and described herein.
Figure 18:
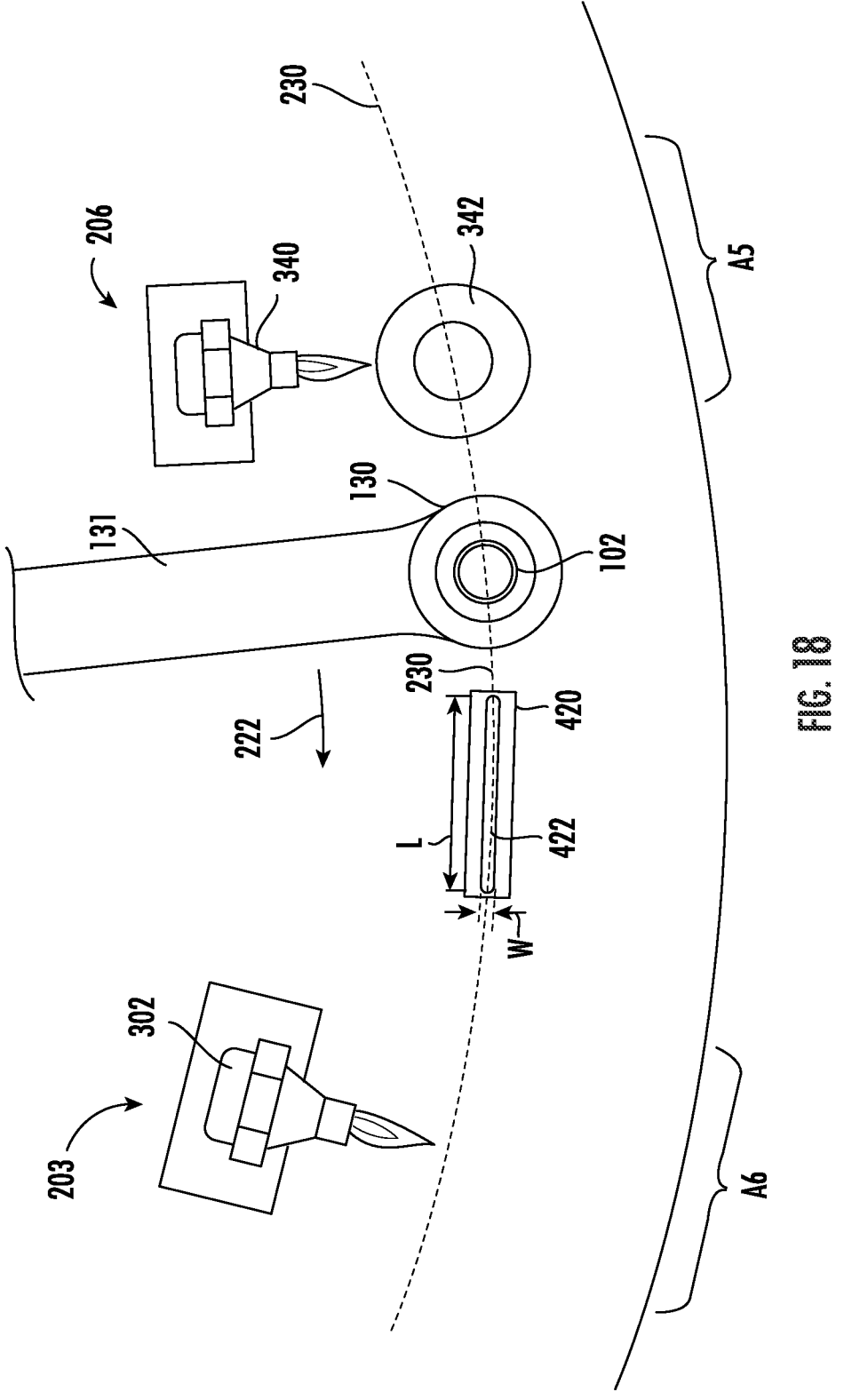
FIG. 18 schematically depicts a top view of the portion of the main turret shown in FIG. 17, according to one or more embodiments shown and described herein.

Referring now to FIG. 17, in embodiments, the piercing device 400 can include one or a plurality of shaped piercing burners 420 to increase the contact time of piercing burner with the meniscus 350. The shaped piercing burner 420 can be configured to produce a shaped flame 422 instead of a single-point flame, such as the single-point flame 406 depicted in FIGS. 12 and 13. Referring to FIG. 18, the shaped piercing burner 420 can produce a shaped flame 422 having a length L that is greater than a width W of the shaped flame 422. In embodiments, the shaped flame 422 can have length L that is greater than 2 times the width W of the shaped flame 422, such as greater than 3 times, greater than 4 times, greater than 5 times, or even greater than 10 times the width W of the shaped flame 422. In embodiments, the shaped piercing burner 420 can be configured to produce a shaped flame 422 having length L that is greater than or equal to 0.1 times the diameter of the glass tube 102, such as greater than or equal to 0.2, times, greater than or equal to 0.25 times, greater than or equal to 0.5 times, greater than or equal to 0.75 times, or even greater than or equal to 1.0 times the diameter of the glass tube 102.

Figure 19:
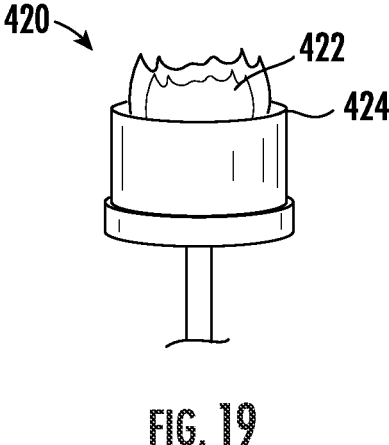
FIG. 19 schematically depicts one embodiment of a shaped piercing burner, according to one or more embodiments shown and described herein.
Figure 20:
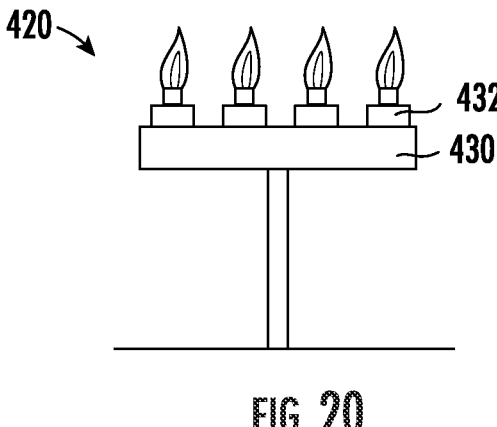
FIG. 20 schematically depicts another embodiment of a piercing burner with multiple burner nozzles that simulate a shaped burner, according to one or more embodiments shown and described herein.

Referring to FIG. 19, in embodiments, the shaped piercing burner 420 can include a single burner nozzle 424 capable of producing the shaped flame 422. Referring to FIG. 20, in embodiments, the shaped piercing burner 420 can include a manifold 430 comprising a plurality of burner nozzles 432 arranged successively in a line or curve. The plurality of burner nozzles 432 may each produce a separate flame, but the separate flames can be close together or can combine to approximate a shaped flame.

Referring again to FIG. 18, the shaped piercing burner 420 can be configured to produce the shaped flame 422 that extends along at least a portion of the path of travel 230 of the glass tube 102 from the separating station 206 to the auxiliary processing station 203. The shaped piercing burner 420 can be positioned so that the meniscus 350 at the working end 150 of the glass tube 102 contacts the shaped flame 422 of the shaped piercing burner 420 for the greatest contact time possible at the index rate of the converter 100. In embodiments, the shaped piercing burner 420 can be positioned so that the length L of the shaped flame 422 is parallel to the path of travel 230 of the glass tube 102 or parallel to a line tangent to the path of travel 230 of the glass tube 102. For a linear arrangement of processing stations 106, the shaped piercing burner 420 can be positioned so that the length L is generally parallel to the path of travel 230 of the glass tube 102. In embodiments, the path of travel 230 of the glass tube 102 between the separating station 206 and the auxiliary processing station 203 is linear, and the shaped piercing burner 420 is positioned so that a centerline of the shaped flame 422 is congruent with the path of travel 230 of the glass tube 102. The centerline of the shaped flame 422 is a line that is parallel to the length L and bisects the width W of the shaped flame 422. In embodiments, the path of travel 230 of the glass tube 102 between the separating station 206 and the auxiliary processing station 203 can be curved (e.g., such as being congruent with an arc of a circle), and the shaped piercing burner 420 can be positioned so that the centerline of the shaped flame 422 can be parallel to a line tangent to the curve of the path of travel 230 of the glass tube 102. When the path of travel 230 is curved, the shaped piercing burner 420 can be positioned so that the centreline of the shaped flame 422 is congruent with the line tangent to the curve of the path of travel 230 or spaced apart from the line tangent to the curve of the path of travel 230. The line tangent to the curve of the path of travel 230 of the glass tube 102 refers to the tangent line at the center axis D of the glass tube 102 at the point along the path of travel of the glass tube 102 where the glass tube 102 is centered over the shaped piercing burner 420.

The converter 100 can be configured to pass the glass tube 102 over the shaped piercing burner 420 while indexing the glass tube 102 from the separating station 206 to the auxiliary processing station 203. While the converter 100 translates the glass tube 102 over the shaped piercing burner 420, the shaped flame 422 contacts the meniscus 350 at the working end 150 of the glass tube 102, where contact of the shaped flame 422 with the meniscus 350 pierces the meniscus 350 and opens the working end 150 of the glass tube 102. The converter 100 can include a single shaped piercing burner 420 or a plurality of shaped piercing burners 420 arranged successively along the path of travel 230 of the glass tube 102.

Figure 21:
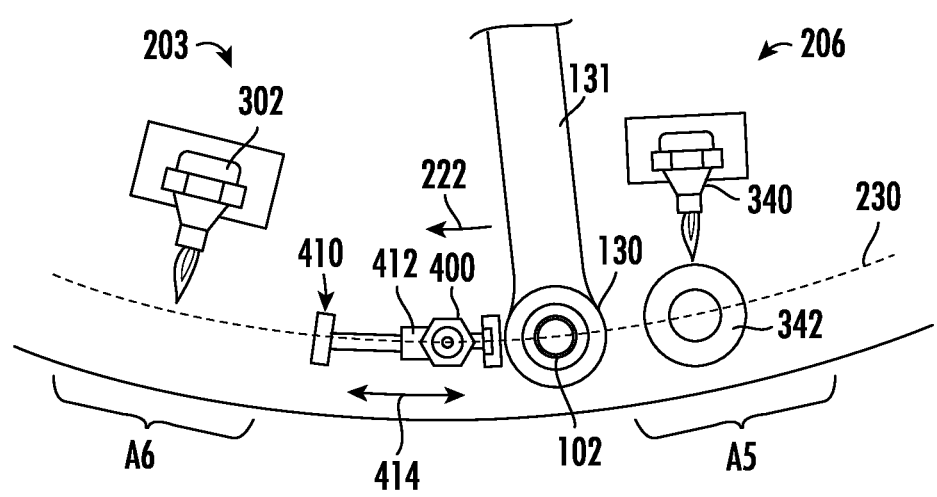
FIG. 21 schematically depicts a top view of a portion of the main turret of the converter of FIG. 2 with still another embodiment of a piercing device, according to one or more embodiments shown and described herein.
Figure 22:
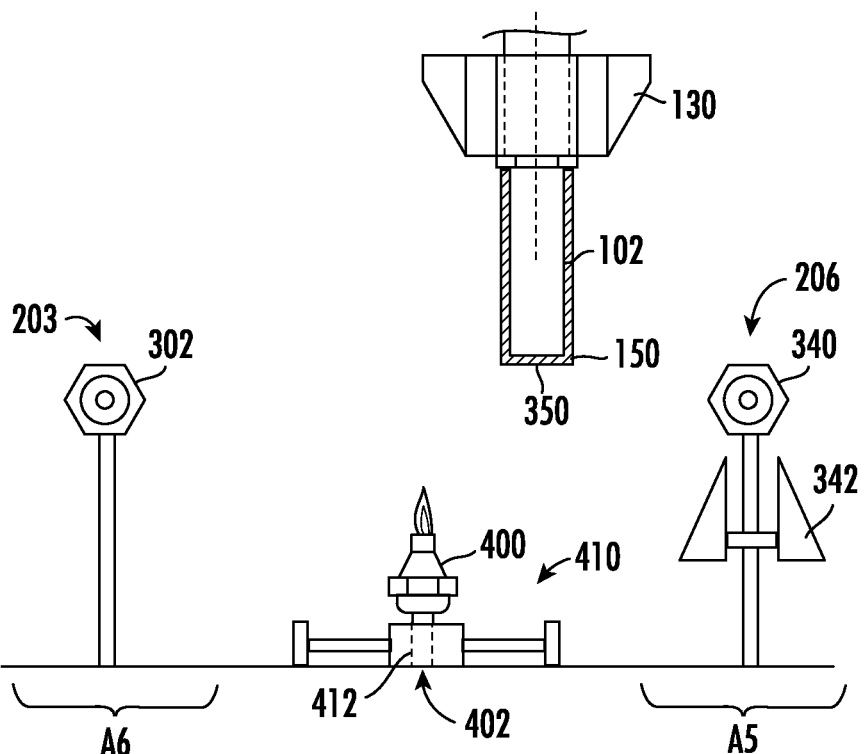
FIG. 22 schematically depicts a side view of the piercing device of FIG. 21, according to one or more embodiments shown and described herein.

Referring now to FIGS. 21 and 22, in embodiments, the piercing device 400 can include the piercing device actuator 410, and the piercing device actuator 410 can be positioned to translate the piercing device 400 along at least a portion of the path of travel 230 of the glass tube 102 between the separating station 206 and the auxiliary processing station 203. The piercing device actuator 410 can be operable to translate the piercing device 400 with the glass tube 102 along at least a portion of the path of travel 230 of the glass tube 102 from the separating station 206 to the auxiliary processing station 203. Reference number 414 indicates the direction of motion of the piercing device actuator 410 in FIG. 21. Although shown in FIGS. 21 and 22 as a single point piercing burner, it is understood that the piercing device 400 can be any of the piercing devices previously discussed herein, such as shaped piercing burners 420, a plurality of burners, suction tubes, forced-air piercing devices, mechanical piercing devices or combinations of these. Translation of the piercing device 400 with the glass tube 102 while moving the glass tube 102 along at least a portion of the path of travel 230 can maintain the piercing device 400 in engagement with the meniscus 350 at the working end 150 of the glass tube 102 for a longer contact time compared to maintaining the piercing device 400 at a fixed location. The piercing device actuator 410 can have a range of motion sufficient to maintain the piercing device 400 in engagement with the meniscus 350 of the glass tube 102 until the piercing device 400 successfully pierces the meniscus 350 to open the working end 150 of the glass tube 102.

The converter 100 may be operable to detect when the glass tube 102 has moved into engagement with the piercing device 400, such as by including one or more position sensors, limit switches, or other proximity-sensing device. Once the converter 100 detects that the glass tube 102 has moved into engagement with the piercing device 400, the converter 100 can then operate the piercing device actuator 410 to move the piercing device 400 in conjunction with the glass tube 102 along the portion of the path of travel 230 of the glass tube 102. Operation of the piercing device actuator 410 moves the piercing device 400 with the glass tube 102 to maintain engagement of the piercing device 400 with the meniscus 350 of the glass tube 102. While moving the piercing device 400 with the glass tube 102, the piercing device 400 may engage or contact the meniscus 350 of the glass tube 102, where the engagement or contact pierces the meniscus 350 to open the working end 150 of the glass tube 102.

The converter 100 having the piercing device 400 disposed between the stationary separating station 206 and the stationary auxiliary processing station 203 can be used in a method for producing a plurality of glass articles from a glass tube. Referring again to FIGS. 11 and 12, the methods for producing a plurality of glass articles from glass tube 102 can include securing the glass tube 102 in the holder 130 of the converter 100. The converter 100 can include any of the features of the converter 100 previously described herein. The converter 100 can comprise a plurality of processing stations 106, where the plurality of processing stations 106 can include a plurality of the heating stations 202, at least one of the forming stations 204, and the separating station 206. The converter 100 indexes the holder 130 and the glass tube 102 successively through each of the processing stations 106. The methods can further include forming one or more features of a glass article at the working end 150 of the glass tube 102 by indexing the glass tube 102 through each of the plurality of heating stations 202 and the at least one forming station 204 and then separating the glass article from the working end 105 of the glass tube 102 in the separating station 206. Separating the glass article from the working end 150 of the glass tube 102 forms the meniscus 350 of glass at the working end 150 of the glass tube 102. The methods can further include indexing the glass tube 102 from the separating station 206 to the auxiliary processing station 203 disposed directly downline of the separating station 206 and piercing the meniscus 350 while indexing the glass tube 102 between the separating station 206 and the auxiliary processing station 203 during an index time of the converter. The auxiliary processing station 203 can be one of the plurality of heating stations 202 or one of the forming stations 204. Piercing the meniscus 350 opens the working end 150 of the glass tube 102.

Separating the glass article from the working end 150 of the glass tube 102 can include thermally separating the partially formed glass article from the working end 150 of the glass tube 102. Referring to FIG. 6, thermally separating the partially formed glass article from the glass tube 102 can include heating a separating region of the glass tube 102 with a separating burner 340 in the separating station 206, where the heating increases the viscosity of the glass in the separating region of the glass tube 102 to the point where gravitational forces cause the partially formed glass article to separate from the working end 150 of the glass tube 102. In some embodiments, the partially formed glass article can be pulled gradually away from the working end 150 of the glass tube 102 during heating with the separating burner 340. Thermal separating in the separation station 206 forms the meniscus 350 of glass over the working end 150 of the glass tube 102.

Referring again to FIGS. 11 and 12, piercing the meniscus 350 of the glass tube 102 can include passing the glass tube 102 into and through engagement with the piercing device 400 that is disposed between the separating station 206 and the auxiliary processing station 203. The piercing device 400 can be any of the piercing devices described herein. In embodiments, the glass tube 102 can be constantly moving between the separating station 206, which is stationary, and auxiliary processing station 203, which is also stationary and immediately downline from the separating station 206. In other words, the glass tube 102 and holder 130 are in motion while being acted upon by the piercing device 400. Piercing the meniscus 350 does not occur during a dwell time of the converter 100. As previously discussed, the dwell time is the duration of time that the glass tube 102 spends in a particular processing station (e.g., separating station 106) before being translated to a next immediately adjacent processing station (e.g., the auxiliary processing station 203).

Piercing the meniscus 350 of the glass tube 102 can include translating the glass tube 102 over the piercing device 400 that is positioned below the path of travel 230 of the glass tube 102 between the separating station 206 and the auxiliary processing station 203. Referring again to FIGS. 11-13, in embodiments, the methods can include maintaining the piercing device 400 at the fixed position 402 and translating the glass tube 102 past the piercing device 400 at the fixed position 402. Referring to FIG. 14, in embodiments, the methods can include translating the piercing device 400 into and out of a position at which the piercing device 400 can engage the meniscus 350 at the working end 150 when the glass tube 102 is passed by the position. The piercing device 400 can be translated into and out of the position by piercing device actuator 410 as previously described herein. Referring to FIGS. 21 and 22, in embodiments, the methods can include translating the piercing device 400 with the glass tube 102 along at least a portion of the path of travel 230 of the glass tube 102 between the separating station 206 and the auxiliary processing station 203. Translating the piercing device 400 with the glass tube 102 can maintains the piercing device 400 in engagement with the meniscus 350 of the glass tube 102 for a greater period of time compared to maintaining the piercing device 400 at a fixed position. The piercing device 400 can be translated by operating the piercing device actuator 410, as previously discussed herein.

Referring now to FIGS. 11-13, in embodiments, the piercing device 400 can be a piercing burner 404. In embodiments, the piercing the meniscus 350 of the glass tube 102 can include heating the meniscus 350 with the piercing burner 404 while translating the glass tube 102 between the separating station 206 and the auxiliary processing station 203. The piercing burner 404 can have any of the features previously described herein for the piercing burner 404. In embodiments, the piercing burner 404 can be a single point burner. Referring to FIGS. and 16, the methods can include passing the glass tube 102 into and through engagement with a plurality of piercing burners 404 arranged successively along the path of travel 230 of the glass tube 102 from the separating station 206 to the auxiliary processing station 203. Referring now to FIGS. 17-20, in embodiments, the method can include passing the glass tube 102 into and through engagement with a shaped piercing burner 420 that produces a shaped flame 422 that extends along at least a portion of the path of travel 230 of the glass tube 102 from the separating station 206 to the auxiliary processing station 203.

EXAMPLES

The following examples illustrate the operation of the disclosed converter and methods for producing a plurality of glass articles from glass tube. The following examples are not intended to limit the scope of the present disclosure.

Figure 23:
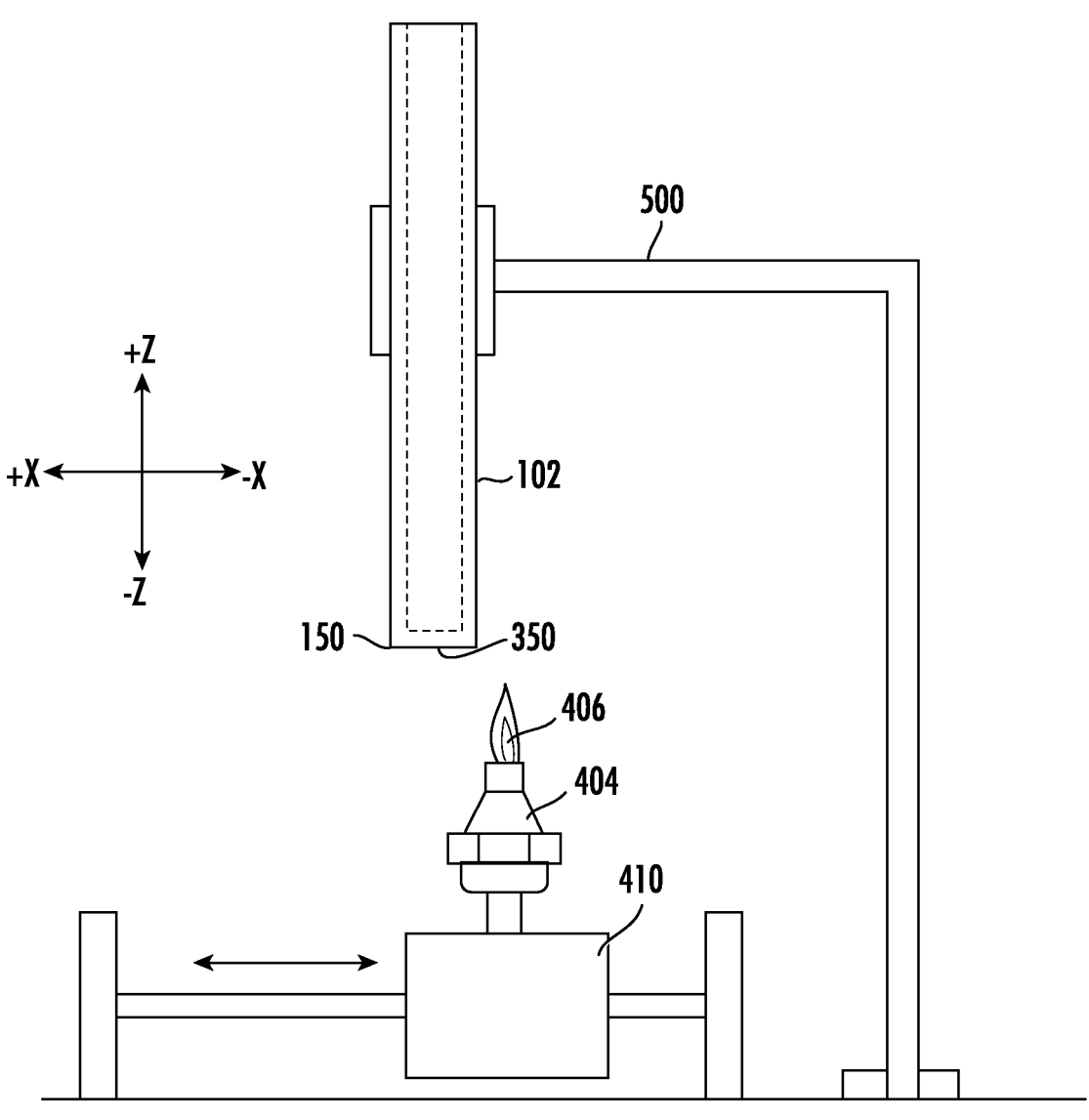
FIG. 23 schematically depicts a front view of an experimental apparatus for evaluating viability of piercing a meniscus while having relative movement between the glass tube and the piercing device, according to one or more embodiments shown and described herein.

The following example illustrates the piercing of the meniscus of the glass tube during the index time of the converter after the separating step. Referring now to FIG. 23, the bench-top apparatus 500 for illustrating piercing of the meniscus 350 at the working end 150 of the glass tube 102 during the index time for these examples is schematically depicted. The apparatus 500 includes a fixed stand 502 coupled to a holder 504 that is operable to secure and rotate the glass tube 102. The apparatus 500 further includes a piercing device actuator 410 coupled to a piercing burner 404. The fixed stand 502 holds the glass tube 102 and holder at a fixed position, while the piercing device actuator 410 translates the piercing burner 404 underneath of the working end 150 of the glass tube 102 to simulate the relative motion of the glass tube 102 and the piercing burner 404 during indexing of the glass tube 102 between processing stations. The piercing device actuator 410 was positioned so that the flame 406 of the piercing burner 404 contacted the meniscus 350 of glass at the working end 150 of the glass tube 102 when the piercing burner 404 was translated underneath the working end 150 of the glass tube 102.

Prior to piercing the meniscus 350 of the glass tube 102, the glass tube 102 was processed through a series of processing steps that mirror the processing steps of a typical converter for making glass articles from the glass tube 102. The series of processing steps was conducted to simulate the thermal environment and condition of the glass tube 102 in an actual converter. In particular, the glass tube 102 was first subjected to a plurality of heating steps and forming steps to produce the features of a glass article at the working end of the glass tube 102. Each heating and forming step was conducted at the fixed position during a constant dwell time by moving different burners and or forming tools into engagement with the glass tube maintained at the fixed position. Between each processing step, the glass tube 102 was maintained idle in the fixed position with no processing in order to simulate the index time of the glass tube 102. Following formation of the features at the working end 150 of the glass tube 102, the glass tube 102 was dropped in a tube drop station, and the stationary glass tube 102 was subjected to separation pre-heat steps, each step conducted for the constant dwell time with the constant idle index time between each separation pre-heat step. After the preheat steps, the glass article was separated from the working end 150 of the glass tube 102 using a separating burner. The separation was completed during the constant dwell time. Immediately following the separation with the separating burner, the piercing device actuator 410 was operated to move the piercing burner 404 underneath the working end 150 of the glass tube 102 during the index time at a rate of about 0.3 meters per second (m/s), which approximate the linear speed of a glass tube as it is indexed between processing stations on a converter.

The glass tubing in these Examples was aluminosilicate glass tubing, such as VALOR® glass manufactured and marketed by Corning Incorporated. The aluminosilicate glass tubing may be further processed by annealing and/or ion exchanging the glass tubing after converting. Although aluminosilicate glass is used in the examples, the effects of the systems and methods disclosed herein are not dependent on the type or composition of the glass.

In this Example, the glass tube 102 was processed with the previously described processing steps to produce a partially formed glass article at the working end 150 of the glass tube 102. The partially formed glass article was separated from the working end 150 of the glass article 102. Immediately after the separating step, the piercing burner 404 was translated underneath the working end 150 of the glass tube 102 at the rate of about 0.3 m/s. Contact of the flame 406 of the piercing burner 404 with the meniscus 350 at the relative speed of 0.3 m/s was sufficient to pierce the meniscus 350 of glass at the working end 150 of the glass tube 102. The glass tube 102 was processed through the series of processing steps, separation and piercing multiple times with successful piercing of the meniscus 350 with relative motion between the working end 150 of the glass tube 102 and the piercing burner 404. These examples demonstrate that the meniscus 350, which is formed at the working end 150 of the glass tube 102 during thermal separation, can be pierced by passing the glass tube 102 though engagement with a piercing burner 404 positioned below the working end 150 of the glass tube 102 while indexing the glass tube 102 between processing stations during the index time.

While various embodiments of the converter 100 and system and methods for producing a plurality of glass articles 103 from glass tubes 102 have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for producing a plurality of glass articles from glass tube, the method comprising:

securing a glass tube in a holder of a converter comprising a plurality of processing stations, the plurality of processing stations comprising a plurality of heating stations, at least one forming station, and a separating station, wherein the converter indexes the holder and the glass tube successively through each of the processing stations;

forming one or more features of a glass article at a working end of the glass tube by indexing the glass tube through each of the plurality of heating stations and the at least one forming station;

separating the glass article from the working end of the glass tube in the separating station, wherein separating the glass article from the working end of the glass tube forms a meniscus of glass at the working end of the glass tube;

indexing the glass tube from the separating station to an auxiliary processing station that is disposed directly downline of the separating station, the auxiliary processing station comprising one of the plurality of heating stations or one of the at least one forming stations; and translating the glass tube over a piercing burner positioned below a path of travel of the glass tube between the separating station and the auxiliary processing station to pierce the meniscus while indexing the glass tube between the separating station and the auxiliary processing station during an index time of the converter, wherein:

the index time is a duration of time during which the glass tube is translated from one processing station to a next immediately adjacent processing station; and piercing the meniscus opens the working end of the glass tube.

2. The method of claim 1, wherein piercing the meniscus of the glass tube comprises passing the glass tube into engagement with a piercing device disposed between the separating station and the auxiliary processing station.

3. The method of claim 1, wherein piercing the meniscus does not occur during a dwell time of the converter, wherein the dwell time is a duration of time that the glass tube spends in a particular processing station before being translated to the next immediately adjacent processing station.

4. The method of claim 1, comprising maintaining the piercing burner at a fixed position and translating the glass tube past the piercing burner at the fixed position.

5. The method of claim 1, comprising translating the piercing burner into and out of a position at which the piercing burner engages the meniscus at the working end when the glass tube is passed by the position.

6. The method of claim 1, comprising translating the piercing burner with the glass tube along at least a portion of the path of travel of the glass tube between the separating station and the auxiliary processing station, wherein translating the piercing burner with the glass tube maintains the piercing burner in engagement with the meniscus of the glass tube for a greater period of time compared to maintaining the piercing burner at a fixed position.

7. The method of claim 1, wherein the piercing burner is a single point burner, a shaped burner, or both.

8. The method of claim 1, comprising passing the glass tube into engagement with a plurality of piercing burners arranged successively along a path of travel of the glass tube from the separating station to the auxiliary processing station.

\* \* \* \* \*